United States Patent [19]

Hirai et al.

[11] Patent Number: 5,471,276

[45] Date of Patent: Nov. 28, 1995

[54] PHOTOMETRY SYSTEM

[75] Inventors: Isamu Hirai; Hideaki Tsuji, both of Tokyo, Japan

[73] Assignee: Asahi Kogaku Kogyo Kabushiki Kaisha, Tokyo, Japan

[21] Appl. No.: 424,606

[22] Filed: Apr. 17, 1995

Related U.S. Application Data

[63] Continuation of Ser. No. 245,164, May 17, 1994, abandoned.

[30] Foreign Application Priority Data

May 17, 1993 [JP] Japan .................................. 5-139551

[51] Int. Cl.⁶ ................................................ G03B 17/18
[52] U.S. Cl. ................................................ 354/465
[58] Field of Search .................................... 354/429, 432, 354/471–475, 159, 465, 466

[56] References Cited

U.S. PATENT DOCUMENTS

| | | | |
|---|---|---|---|
| 4,035,815 | 7/1977 | Takahashi | 354/471 |
| 4,146,319 | 3/1979 | Numata et al. | 354/472 |
| 4,681,420 | 7/1987 | Suda et al. | 354/471 X |
| 4,779,117 | 10/1988 | Fujino et al. | 354/475 X |
| 4,949,118 | 8/1990 | Yamamoto et al. | 354/475 |
| 4,977,425 | 12/1990 | Yamamoto et al. | 354/474 |
| 5,170,206 | 12/1992 | Yamamoto et al. | 354/474 |
| 5,218,396 | 6/1993 | Morisawa | 354/471 X |

FOREIGN PATENT DOCUMENTS 60-88931  5/1985  Japan .

*Primary Examiner*—David M. Gray
*Attorney, Agent, or Firm*—Sandler, Greenblum & Bernstein

[57] ABSTRACT

A photometry system for a camera has a finder optical system for receiving light reflected by an object and for forming an image of the object on a finder field, the image corresponding to an image that is formed on a film surface. The photometry system also includes an indicator for projecting a predetermined image onto a predetermined area of the finder field: a photometric sensor that detects a brightness of the image formed on the finder field; and a controller which inhibits the indicator from projecting the predetermined image onto the finder field when the photometric sensor is detecting a brightness of a portion of the finder field which includes the predetermined area.

25 Claims, 34 Drawing Sheets

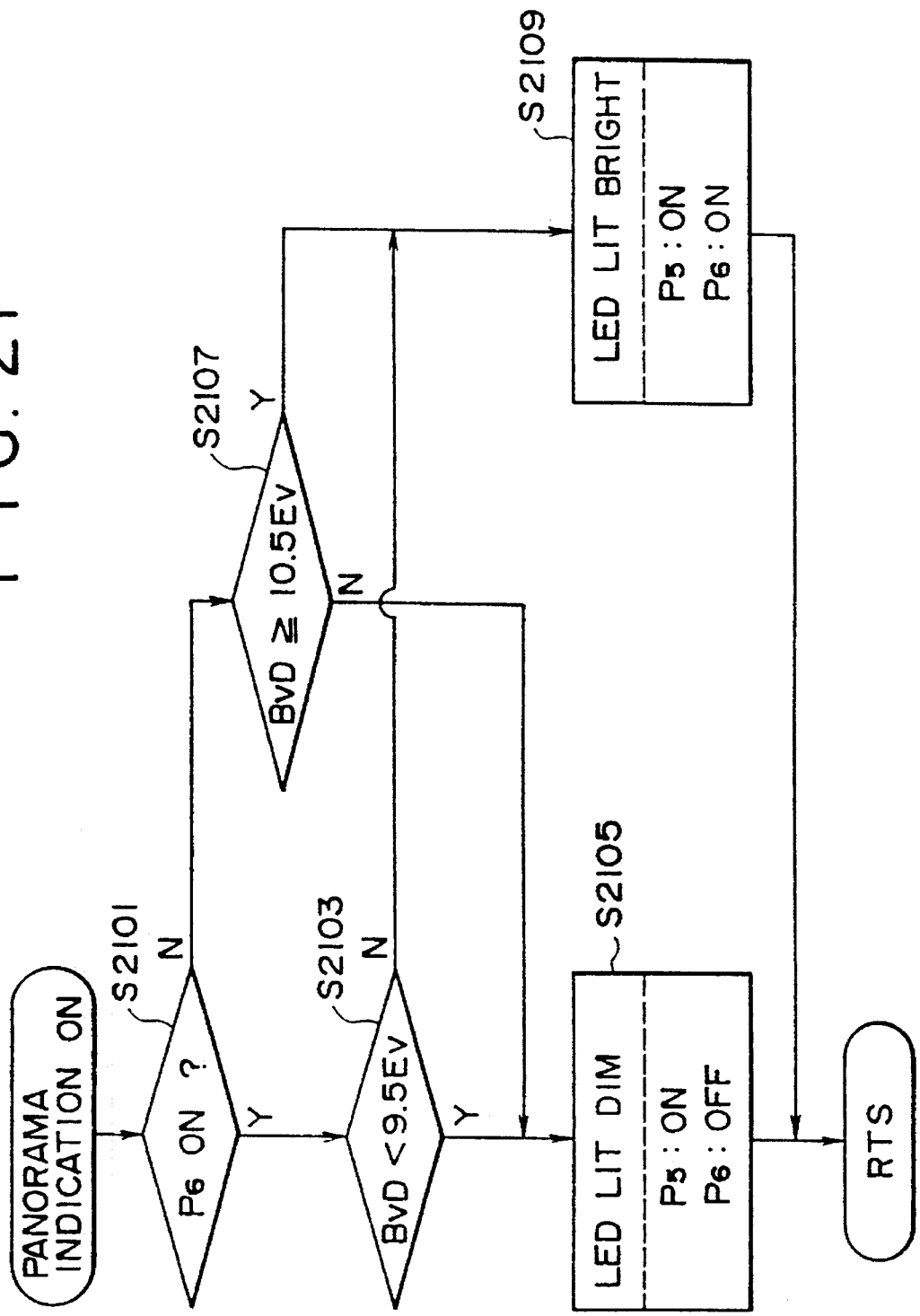

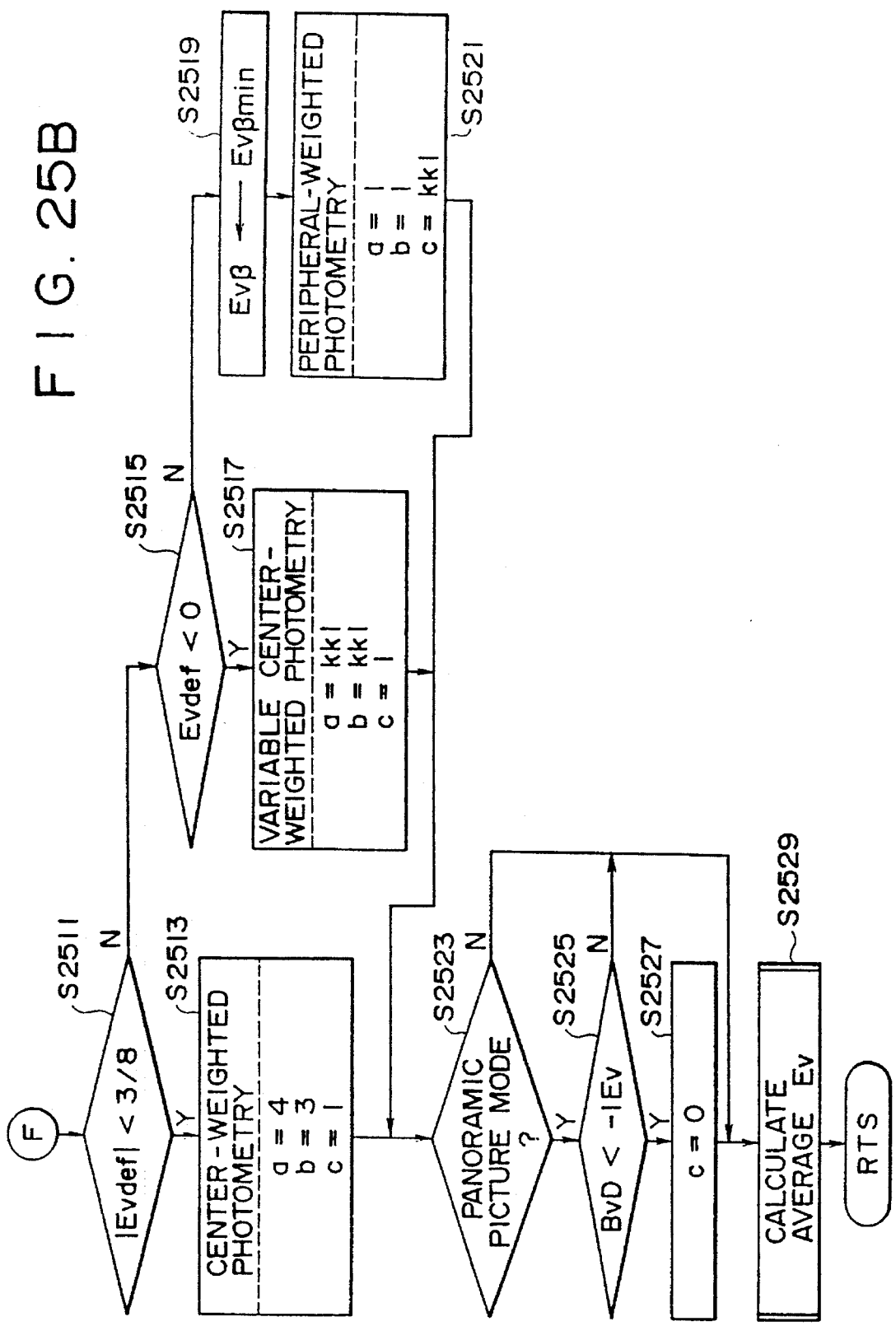

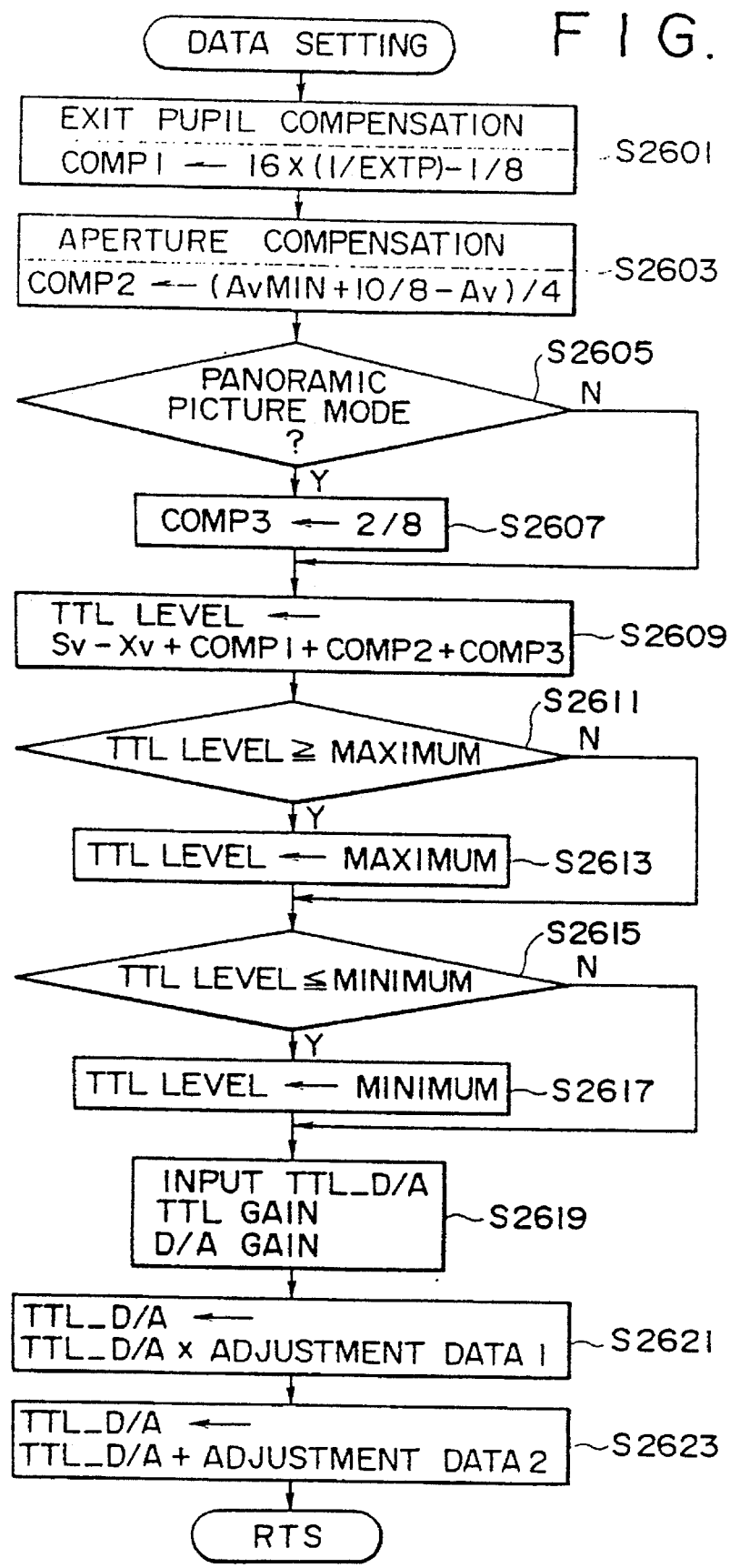
F I G. 26

FIG. 27

TTL_D/A TABLE

| TTL LEVEL | TTL_D/A | TTL GAIN | D/A GAIN | TTL LEVEL | TTL_D/A | TTL GAIN | D/A GAIN | TTL LEVEL | TTL_D/A | TTL GAIN | D/A GAIN |
|---|---|---|---|---|---|---|---|---|---|---|---|
| 3 0/8 | 50 (H) | x1 | x1 | 5 0/8 | 50 (H) | x1 | x1/4 | 7 0/8 | 50 (H) | x4 | x1/4 |
| 3 1/8 | 49 (H) | → | → | 5 1/8 | 49 (H) | → | → | 7 1/8 | 49 (H) | → | → |
| 3 2/8 | 43 (H) |   |   | 5 2/8 | 43 (H) |   |   | 7 2/8 | 43 (H) |   |   |
| 3 3/8 | 3E (H) |   |   | 5 3/8 | 3E (H) |   |   | 7 3/8 | 3E (H) |   |   |
| 3 4/8 | 39 (H) |   |   | 5 4/8 | 39 (H) |   |   | 7 4/8 | 39 (H) |   |   |
| 3 5/8 | 34 (H) |   |   | 5 5/8 | 34 (H) |   |   | 7 5/8 | 34 (H) |   |   |
| 3 6/8 | 30 (H) |   |   | 5 6/8 | 30 (H) |   |   | 7 6/8 | 30 (H) |   |   |
| 3 7/8 | 2C (H) |   |   | 5 7/8 | 2C (H) |   |   | 7 7/8 | 2C (H) |   |   |
| 4 0/8 | 28 (H) | x1 | x1 | 6 0/8 | 28 (H) | x1 | x1/4 | 8 0/8 | 28 (H) | x4 | x1/4 |
| 4 1/8 | 25 (H) | → | → | 6 1/8 | 25 (H) | → | → | 8 1/8 | 25 (H) | → | → |
| 4 2/8 | 22 (H) |   |   | 6 2/8 | 22 (H) |   |   | 8 2/8 | 22 (H) |   |   |
| 4 3/8 | 1F (H) |   |   | 6 3/8 | 1F (H) |   |   | 8 3/8 | 1F (H) |   |   |
| 4 4/8 | 1C (H) |   |   | 6 4/8 | 1C (H) |   |   | 8 4/8 | 1C (H) |   |   |
| 4 5/8 | 1A (H) |   |   | 6 5/8 | 1A (H) |   |   | 8 5/8 | 1A (H) |   |   |
| 4 6/8 | 18 (H) |   |   | 6 6/8 | 18 (H) |   |   | 8 6/8 | 18 (H) |   |   |
| 4 7/8 | 16 (H) |   |   | 6 7/8 | 16 (H) |   |   | 8 7/8 | 16 (H) |   |   |

F I G. 30
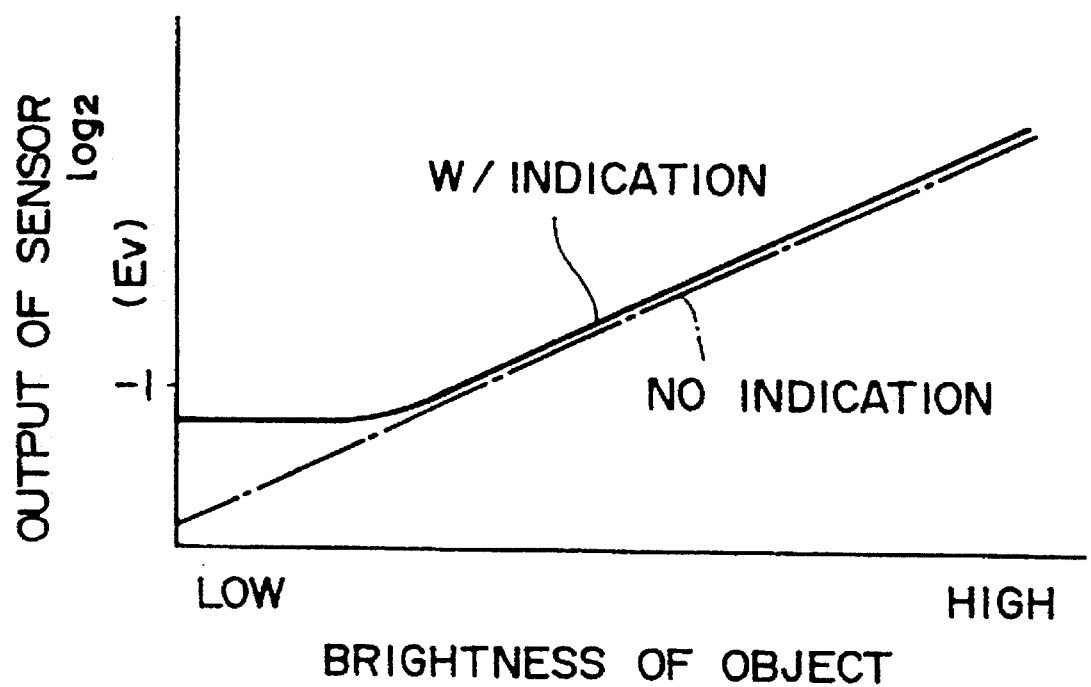

PHOTOMETRY SYSTEM

This application is a continuation of application Ser. No. 08/245,164, filed May 17, 1994, now abandoned.

BACKGROUND OF THE INVENTION

The present invention relates to a photometry system for executing a photometric operation in a camera.

Conventionally, a TTL photometric operation has been employed in a camera, in which, light passes through a photographing lens of the camera and is projected on a focusing screen. By measuring the brightness of the light diverged by the focusing screen, the photometric operation is performed, i.e., the exposure value is determined. Recently, a divided photometry system has become popular, in which the focusing screen is divided into a plurality of zones, and the brightness of each zone is measured.

Also recently, cameras have been provided to select between a normal photographing aperture (full size picture mode) and a panoramic photographing aperture (panoramic picture mode). In the full size picture mode, a full size frame is exposed on the film (i.e., for a 35 mm camera system, the full size picture mode has a film frame size of 24 mm by 36 mm). In the panoramic picture mode, an area at the top and bottom of the normal frame size is shielded, and is not exposed, resulting in an exposure frame, size which is smaller than the full size frame (usually 16 mm by 36 mm for 35 mm cameras). In order to inform an operator of the camera as to which mode is selected, information related to the selected mode is projected on the focusing screen.

If information is projected adjacent to one of the divided zones, the brightness of the zone may change (increase), and thus the determined exposure value may be wrong when the divided photometry system, as described above, is employed.

SUMMARY OF THE INVENTION

It is therefore an object of the present invention to provide an improved TTL photometry system which can provide accurate metering of an image to be photographed even if the information projecting system as described above is employed.

For the above object, according to the invention, there is provided a photometry system for a camera, the camera comprising:

a finder optical system for receiving light reflected by an object and for forming an image of the object on a finder field, the image corresponding to an image to be formed on a film surface; and an indicator for projecting a predetermined image onto a predetermined area of the finder field.

wherein the photometry system comprises:

photometry means for detecting a brightness of the image formed on the finder field; and control means for inhibiting the indicator from projecting the image only when the photometry means detects a brightness of a portion of the finder field, the portion of the focusing screen including the predetermined area.

According to another aspect of the invention, there is provided a photometry system for a camera, the camera comprising:

a finder optical system for receiving light reflected by an object and for forming an image of the object on a finder field, the image corresponding to an image to be formed on a film surface, the finder field being divided into a plurality of light detecting areas; and an indicator for projecting a predetermined image onto a predetermined area of the finder field.

wherein said photometry system comprises:

a plurality of photometry sensors for detecting brightnesses of the light detecting areas; and calculation means for calculating a final brightness value of the image based on the brightnesses detected by the plurality of photometry sensors, the brightnesses being weighted when the final brightness value is calculated, wherein a brightness of a light detecting area which is nearest to the predetermined area has a lower weighting than the other light detecting areas.

According to a further aspect of the invention, there is provided a photometry system for a camera, the camera comprising:

a finder optical system for receiving light reflected by an object and for forming an image of the object on a finder field, the image corresponding to an image to be formed on a film surface; and means for projecting a predetermined image on the finder field.

wherein the photometry system comprises:

means for detecting a brightness level of an image formed on the finder field, the detecting means having a plurality of sensors, each of the sensors detecting a brightness level of a predetermined area of the focusing screen, wherein the predetermined image is inhibited from being projected, when a sensor that detects a brightness level of an area of said finder field where the image is projected, detects a brightness of the predetermined area.

According to a still further aspect of the invention, there is provided a camera comprising:

a finder optical system for receiving light reflected by an object and for forming an image of the object on a finder field, the image corresponding to an image to be formed on a film surface;

an indicator for projecting a predetermined image onto a predetermined area of the finder field, photometry means for detecting a brightness of the image formed on the finder field; and control means for inhibiting the indicator from projecting the image only when the photometry means detects a brightness of a portion of the finder field, the portion of the focusing screen including the predetermined area.

BRIEF DESCRIPTION OF THE DRAWINGS

FIG. 21 shows a subroutine used to control the brightness of the LED light source shown in the schematic of FIG. 14;

FIGS. 25A and 25B show a flowchart of the division algorithm used in the AE calculation subroutine;

FIG. 27 shows a TTL D/A conversion table used in the TTL data setting routine;

FIG. 28 shows the characteristics of a TTL light receiving device used in the camera shown in FIG. 1;

FIG. 30 shows the output of a photometric sensor as a function of the brightness of an object.

DESCRIPTION OF THE EMBODIMENTS

Figure 1:
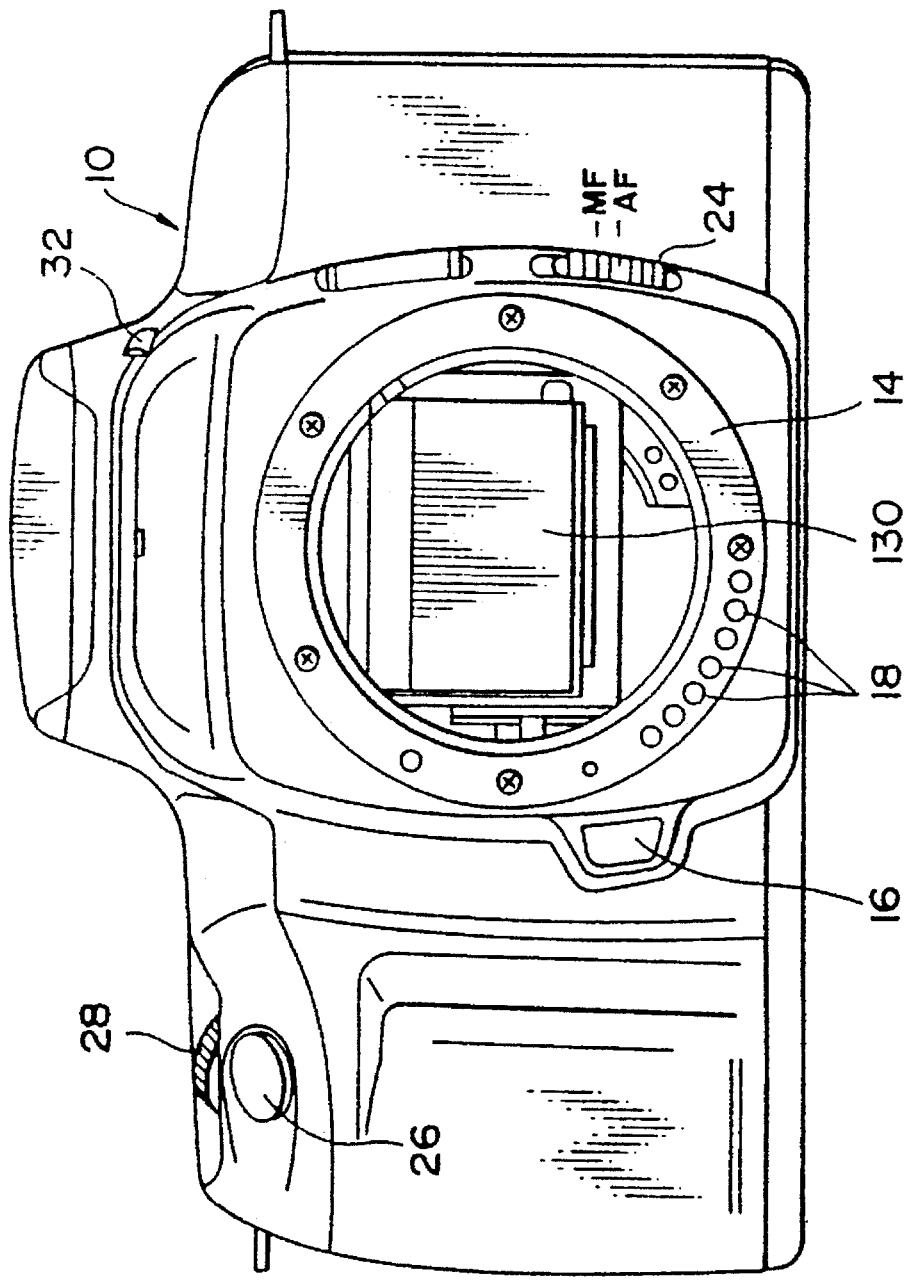
FIG. 1 shows a front view of a camera embodying the present invention.
Figure 2:
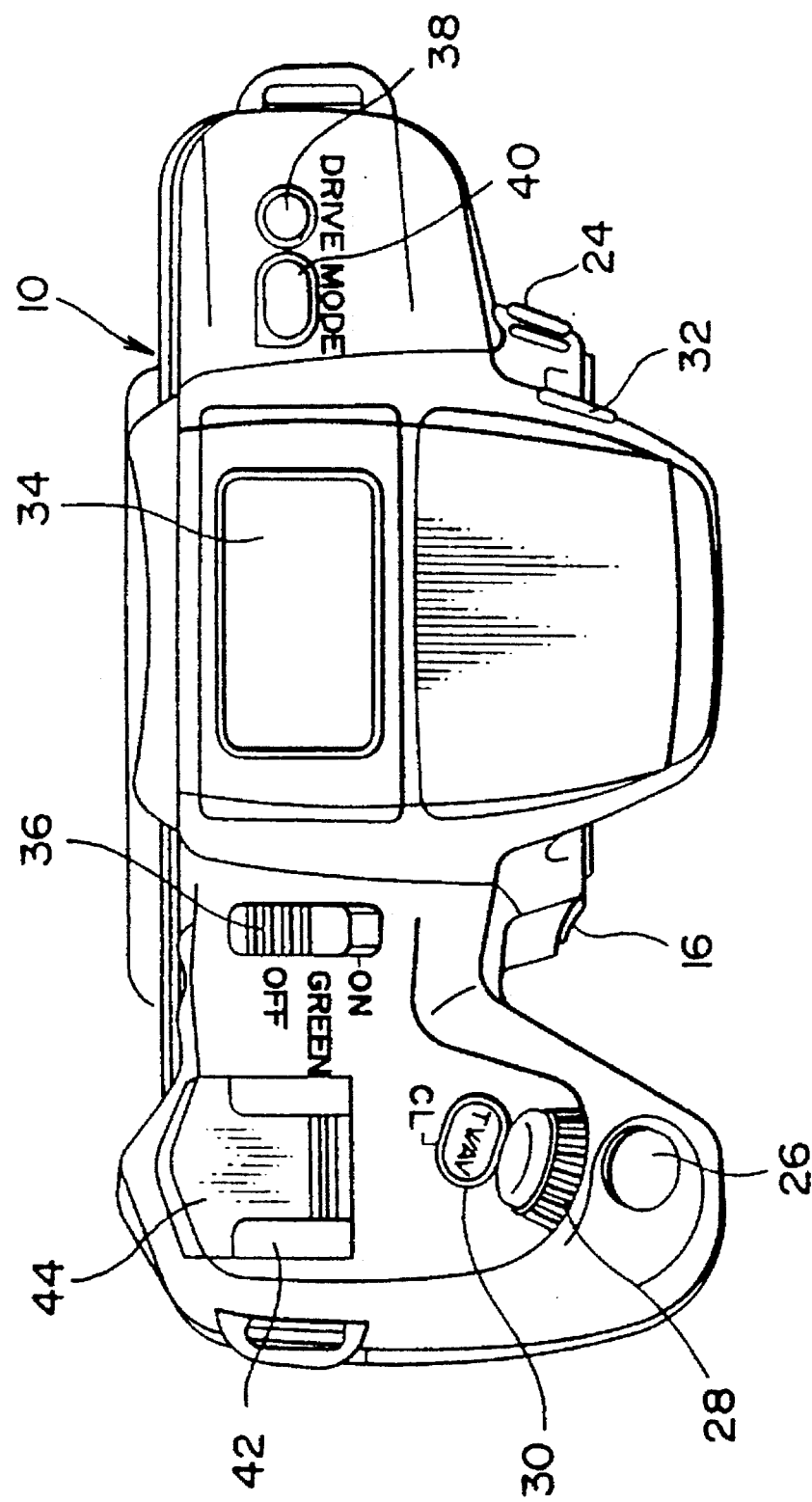
FIG. 2 shows a plan view of the camera shown in FIG. 1.
Figure 3:
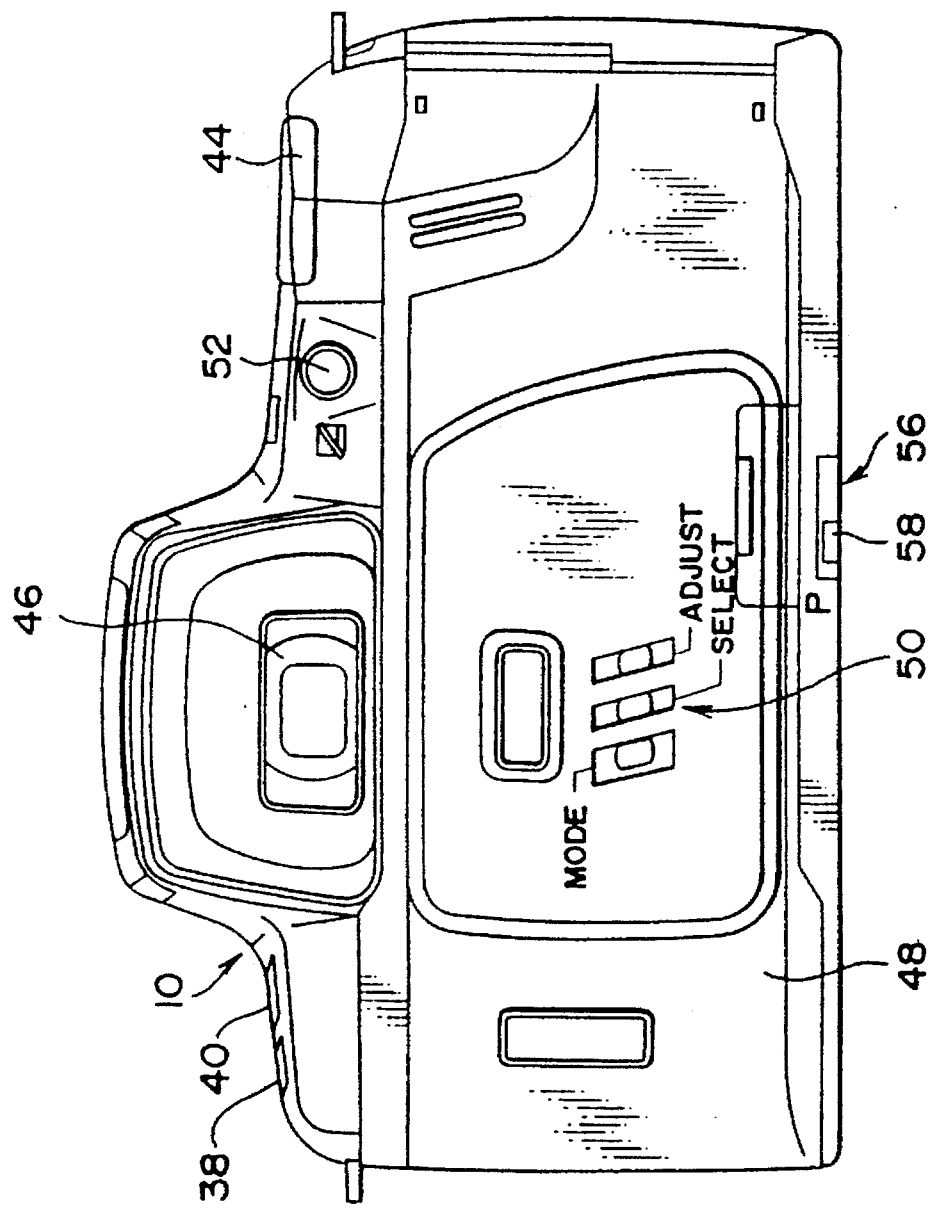
FIG. 3 shows a rear view of the camera shown in FIG. 1.

FIGS. 1 through 3 are front, plan and rear views of a body 10 of an autofocus SLR (Single Lens Reflex) camera embodying the present invention. A photographing lens 12 (see FIG. 13) can be detachably attached to a mount 14 of the body 10. The lens 12 is a power zoom lens, the focal length of which can be changed between 28 mm and 80 mm with a built-in motor (not shown).

The lens 12 is, when it is mounted on the body 14, locked to the mount 14. By depressing button 16, the lens 12 is released and the exchanging of lenses can be done. When the lens 12 is locked, a group of terminals 18 provided on a front surface of the mount 14 contact terminals provided on a rear side surface of the lens 12. This connection of terminals allows communication between a body CPU 20, which is provided in the body 10, and a lens CPU (not shown) provided in the lens 12, via a communication controller 22.

On the right-hand side of mount 14 in FIG. 1, a focus mode slide switch 24 is provided. The focus mode slide switch 24 is movable between upper and lower positions, and switches a focusing mode between an MF (manual focusing) mode and an AF (auto focusing) mode. In the manual focusing mode, the focusing is executed manually by an operator: in the auto focusing mode, the focusing is done automatically. By positioning a mark "–" of the focus mode slide switch 24 at a mark MF or AF, one of the manual focusing mode or the auto focusing mode is selected.

On the left-hand side of the body 10 in FIG. 1, a shutter button 26 is porovided. Adjacent to the shutter button 26, a rocker switch 28 is provided also on the upper surface of the body 10. The rocker switch 28 is used for incrementing or decrementing a data value. The rocker switch 28 is rockable about an axis which is substantially parallel to the optical axis of the photographing lens 12. On the rear side of the rocker switch 28 on the upper surface of the body 10, a Tv/Av button 30, which also functions as a clear button, is provided. The Tv/Av button 30 is used for switching an exposure mode between a shutter speed priority mode and an aperture value priority mode, when an automatic exposure mode or a manual exposure mode is selected.

At the central portion of the upper surface of the body 10, a built-in strobe 54 is provided. When a pop-up button 32 is depressed, the strobe 54 pops us from its retracted position, and is positioned in an operating position. As shown in FIG. 2, on the upper surface of the body 10, an LCD 34 is provided. The LCD 34 displays various information related to the photographing operation. On the left-hand side of the LCD 34, a slide switch 36 is provided. The slide switch 36 can be positioned at ON, Green and OFF positions. When the slide switch 36 is located at the OFF position, the camera is turned OFF, and when it is located at either the Green or ON positions, the camera is turned ON.

When the slide switch 36 is located at the ON position, the photographing mode of the camera is set to a Full specification mode. If the slide switch 36 is located at the Green position, the photographing mode is set to a Green mode.

In the Full specification mode, by operating the rocker switch 28, the photographer can select any one of four photographing modes: program mode, auto exposure mode, manual exposure mode and bulb mode. The Green mode is an automatic exposure mode directed to beginners, i.e., to people who are not so accustomed to the operation of the camera.

When the manual exposure mode is set, the Tv/Av button 30 is used to select whether the shutter speed or the aperture value is to be changed. The shutter speed and aperture values is to be changed. The shutter speed and aperture values are changed by using the rocker switch 28.

On the right-hand side of the upper surface of the body 10 in FIG. 2, a drive button 38 and a mode button 40 are provided. These buttons 38 and 40 are located so that they can be depressed individually or simultaneously by an operator.

By operating the rocker switch 28 while holding down the drive button 38, the drive mode is cycled through a one-shot photographing mode, a multi-shot photographing mode and a self-timer photographing mode. If the main switch lever 36 is positioned to the ON position, and the mode button 40 is depressed, the exposure mode is cycled through a programmed exposure mode, an automatic exposure mode, a manual exposure mode and a bulb exposure mode, by operating the rocker switch 28.

On the left-hand side of the upper surface of the body 10 in FIG. 2, a hot shoe 42 is provided, which is covered with a cover member 44, when unused.

As shown in FIG. 3, on the back surface of the body 10, a view finder optical system 46 is provided. Below the finder optical system 46, an openable back lid 48 covers the body 10. Film is loaded into the camera while the back lid 48 is open. On the back lid 48, a date imprinting unit 50 is provided. On the upper right side of the back surface of the body 10, an exposure compensation button 52 is provided. In the programmed exposure mode, or automatic exposure mode, by operating the rocker switch 28 while holding down the compensation button 52, the photographer can shift the exposure value in either a positive or negative direction.

On the lower side of the back surface of the body 10, a picture size switch lever 58 is provided. The lever 58 is slidable with the back lid 48 closed. When the lever 58 is located at the left side of its slidable area, a full size picture mode is selected. If the lever 58 is located at the right side of its slidable are, a panoramic picture mode is selected.

Figure 13:
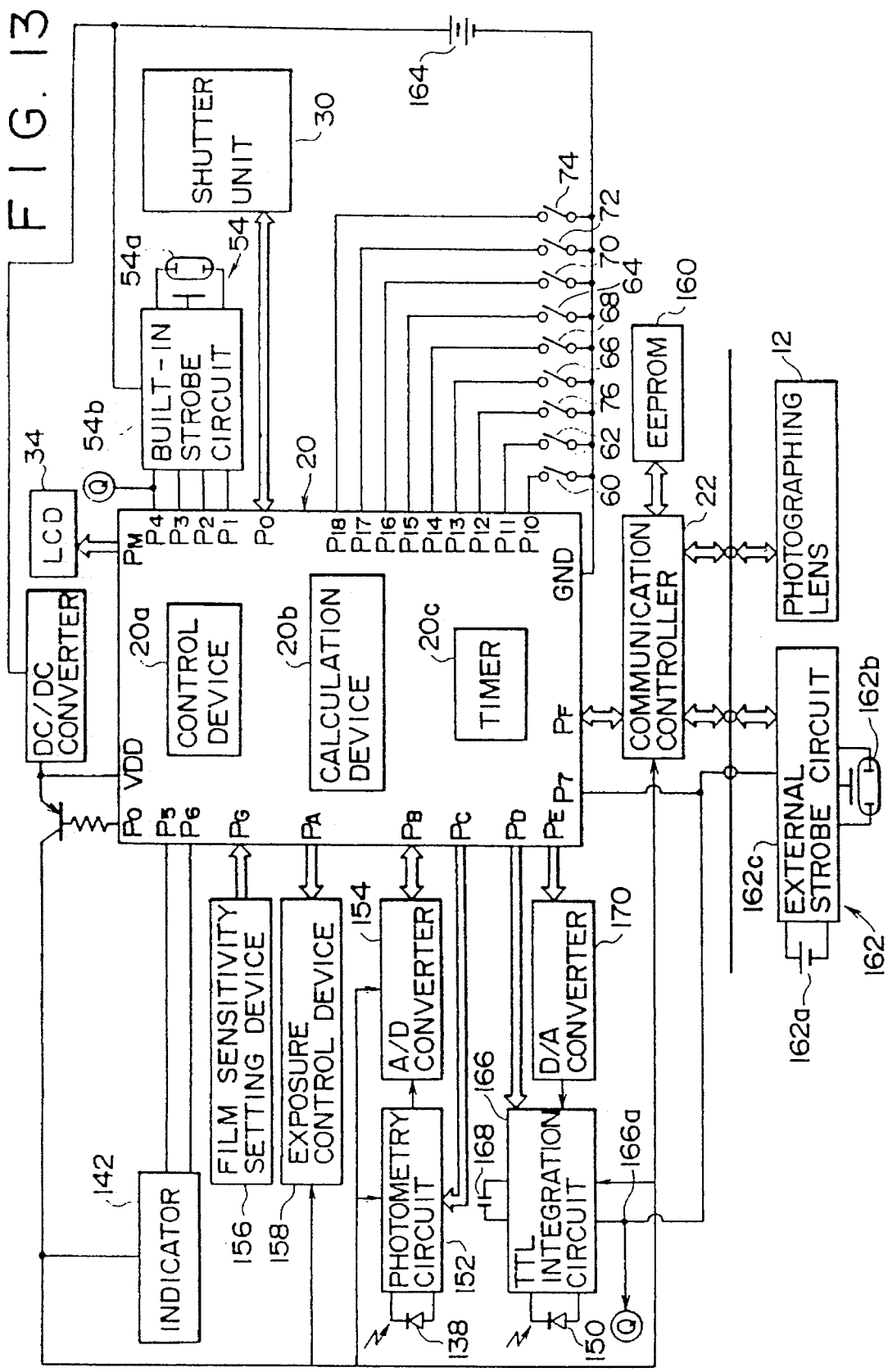
FIG. 13 is a block diagram of the control system of the camera shown in FIG. 1.

The shutter button 26 is a two-step push button. If the shutter button 26 is depressed halfway, a photometry switch 60 shown in FIG. 13 is turned ON. When the shutter button 26 is fully depressed, a release switch 62 shown in FIG. 13 as well as the photometry switch 60 is turned ON. When the Tv/Av button 30 is pressed a Tv/Av switch 64, shown in FIG. 13, is activated.

An up switch 66 in FIG. 13 or a down switch 68 is turned ON depending upon the rocked direction of the rocker switch 28. The rocker switch 28 is biased so that it is neutrally located at the central position within its rockable area. When the rocker switch 28 is at the neutral position, the up and down switches 66 and 68 are both turned ON. When the mode button 40 is depressed, a mode switch 70 (see FIG. 13) is turned ON.

A pop-up detect switch 72 (in FIG. 13) is turned ON when the pop-up button 32 is depressed. According to the position of the lever 58, a panorama switch 74 (see FIG. 13) is turned ON/OFF. The picture mode is switched between the full size picture mode and the panoramic picture mode based on the state of the panorama switch 74.

A mechanism for switching the picture size will be described.

Figure 4:
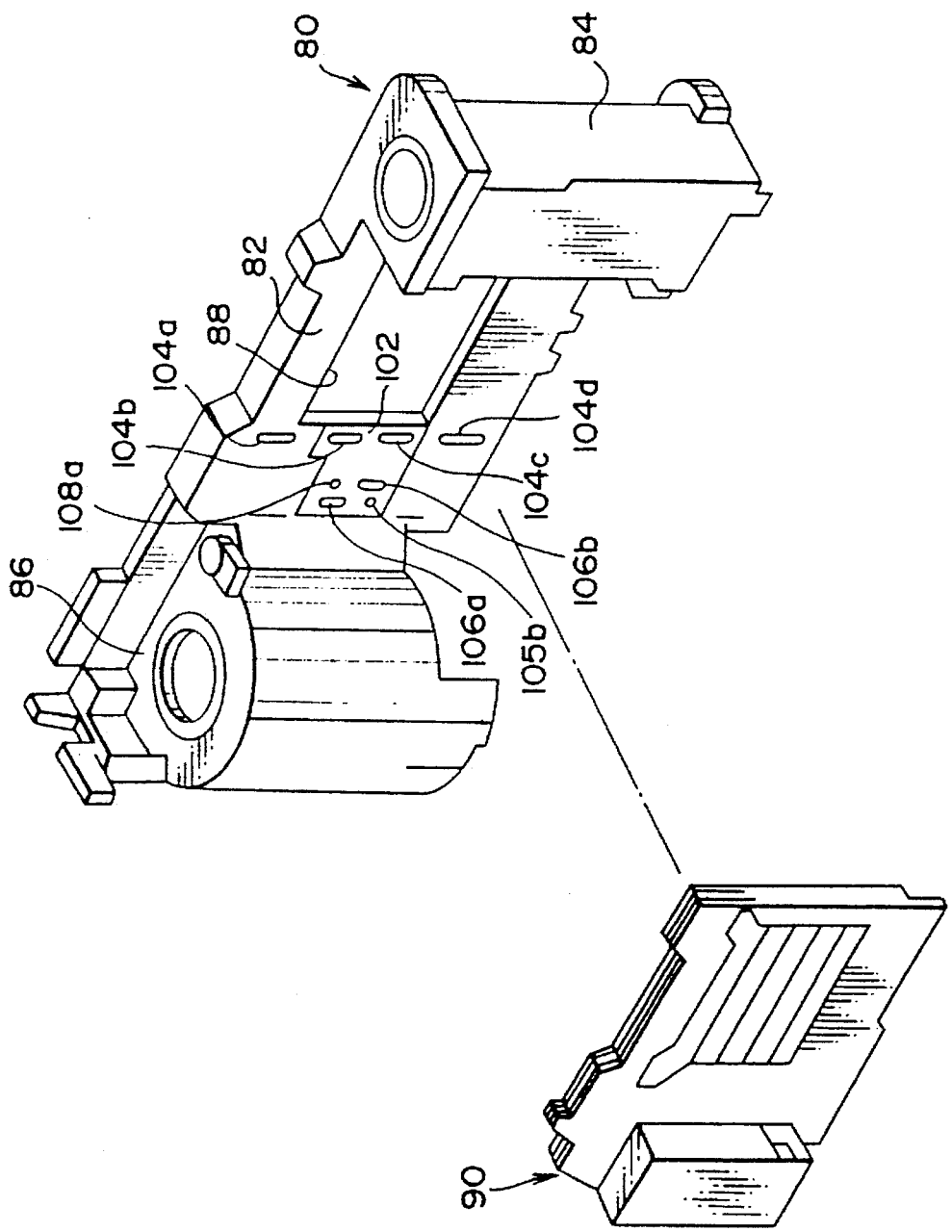
FIG. 4 shows an inside view of a film chamber and shutter assembly of a camera embodying the present invention.

As shown in FIG. 4, the body 10 has a base unit 80 which is made from a die-cast alloy. The base unit 80 has a panel member 82, a film chamber 84 and a film winding chamber 86. On the panel member 82, an opening 88 corresponding to an area of the full size picture is formed. In front of the opening 88 (of the panel member 82), a focal plane shutter unit 90 is provided. The shutter unit 90 has an opening substantially the same size of the opening 88. The opening of the shutter unit 90 is opened/closed by driving a shutter screen.

Figure 5:
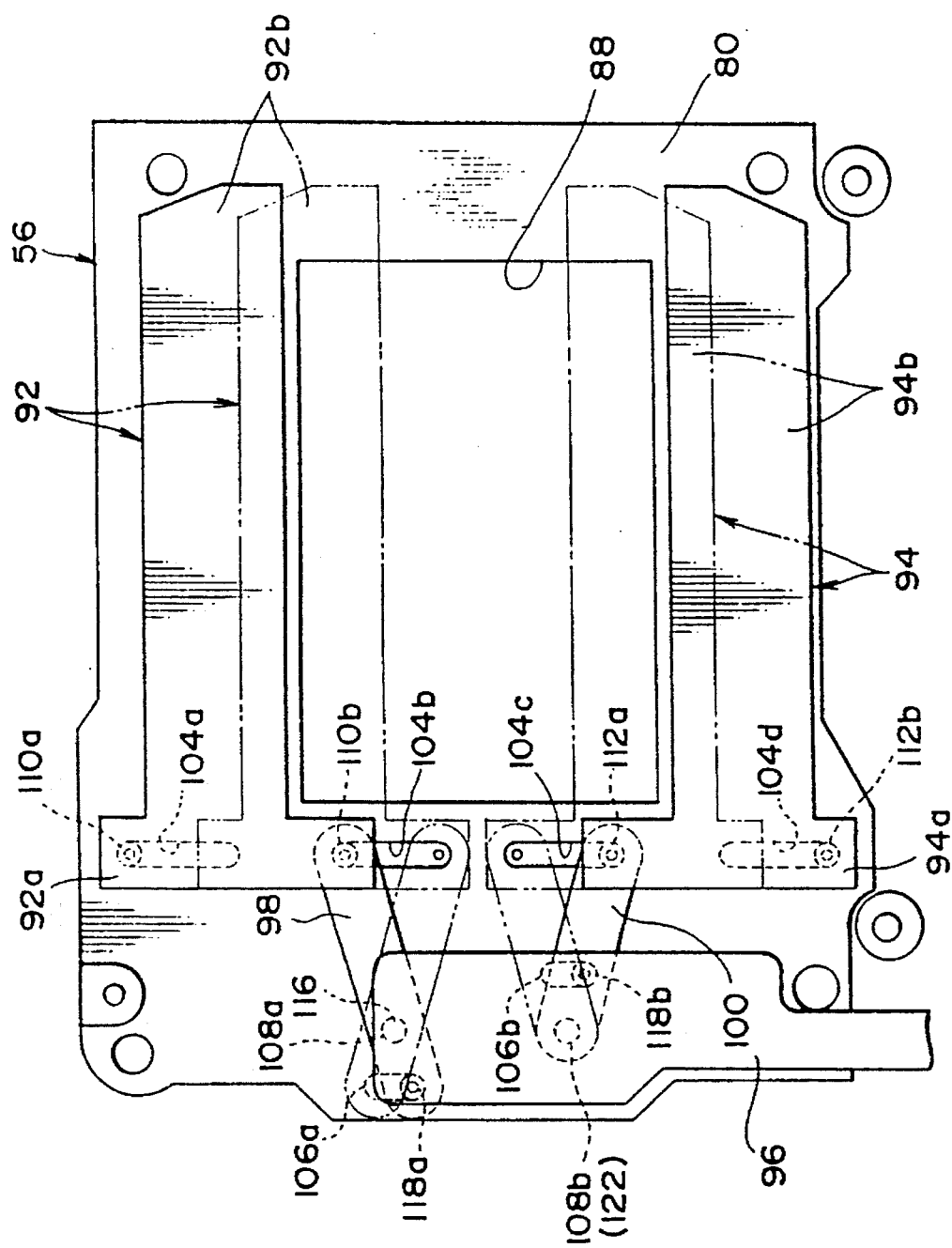
FIGS. 5 through 7 show a picture size change mechanism for changing a size of a photographing aperture of a camera embodying the present invention.

Between the panel member 82 and the shutter unit 90, a picture size changing device 58 is provided, which is shown in FIG. 5. The picture size changing device 56 switches the picture size between the full size and the panoramic size. The picture size changing device 56 has a pair of light shielding plates 92 and 94, a driving plate 96, and a pair of arm plates 98 and 100. The light shielding plates 92 and 94 are used for covering a predetermined upper and lower area of the opening 88 to obtain the panoramic frame. The plates 92, 94, 96, 98 and 100 have a thickness between 0.1–0.2 mm.

The color of the pair of light shielding plates 92 and 94 is black. Therefore, light incident on the light shielding plates 92 and 94 is not reflected by the plates 92 and 94.

Figure 6:
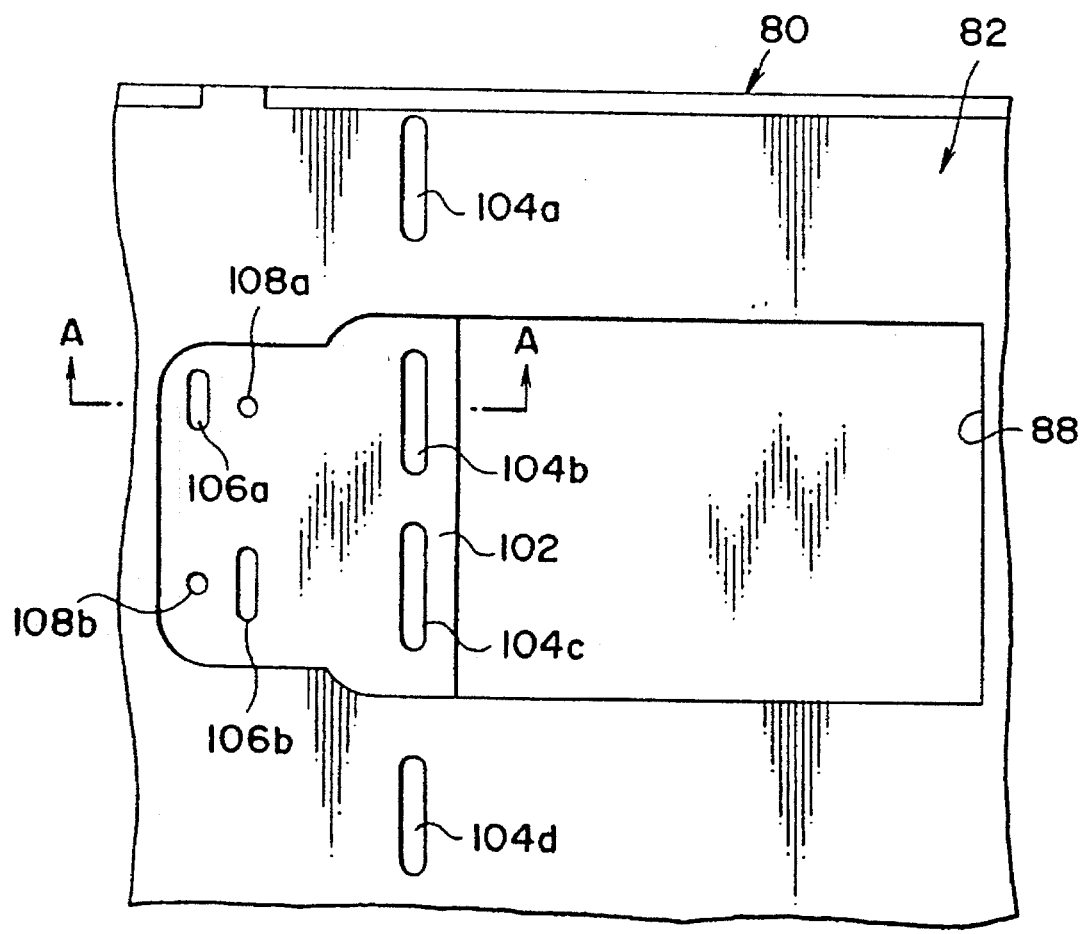
Figure 7:
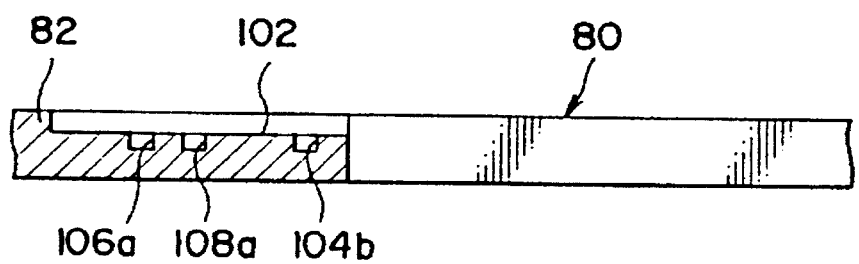

As shown in FIGS. 5, 6 and 7, on the panel member 82, a concave (thin) portion 102 is formed on the left-hand side thereof. Parallel with the shorter side of the opening 88, first guide grooves 104a, 104b, 104c and 104d are formed collinearly. The upper guide grooves 104a and 104b are used for guiding the upper light shielding plate 92, the grooves 104c and 104d for the lower shielding plate 94.

On the thin portion 102, a pair of second guide grooves 106a and 106b for guiding the plate 96 are formed. The guide grooves 106a and 106b are parallel to the shorter side of the opening 88. Further, a pair of holes 108a and 108b are formed in the thin portion 102. The hole 108a is formed a predetermined distance to the right of the guide groove 106a, and the hole 108b is formed a predetermined distance to the left of the groove 106b, as shown in FIG. 6. The holes 108a and 108b function as fulcrum holes for the arm plates 98 and 100, respectively.

The depth of the concave portion 102 with respect to the surface of the panel member 82 is between 0.2 and 0.3 mm. The depths of the first guide grooves 104a through 104d, the second guide grooves 106a and 106b, the fulcrum holes 108a and 108b with respect to the surface of the concave portion 102 are between 0.5 and 1.0 mm.

A pair of dowels 110a and 110b are provided on the upper guide 92a, and a pair of dowels 112a and 112b are provided on the lower guide 94a. The dowels 110a, 110b, 112a and 112b are projected towards the panel member 82. The dowel 110a slidably engages with the guide groove 104a, the dowel 110b slidably engages with the guide groove 104b, the dowel 112a slidably engages the guide groove 104c, and the dowel 112b slidably engages the guide groove 104d.

The clearance of the portion where the dowels 110a, 110b, 112a, 112b engage with the grooves 104a through 104d is accurately designed and manufactured so that the light shielding plates 92 and 94 do not incline.

When the full size picture mode is selected the light shielding plates 92 and 94 are positioned at their maximum displacement from each other, as shown by the solid line of FIG. 5. The opening 88 is fully open. When the panoramic picture mode is selected, the light shielding plates 92 and 94 are located at their closest position to each other, resulting in the upper and lower areas of the opening 88 being covered by the light shielding plates 92 and 94, as indicated by the dotted line, shown in FIG. 5. The dowels 110b and 112a function as engaging pins for connecting the arm plates 98 and 100 to the light shielding plates 92 and 94, respectively.

Figure 8:
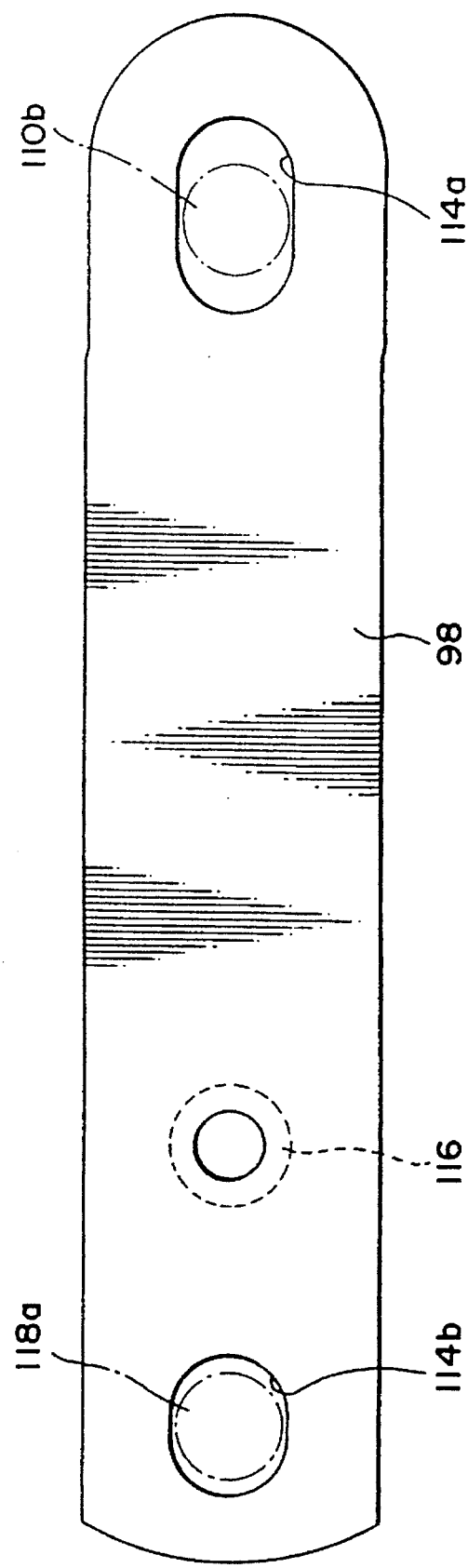
FIGS. 8 and 9 show arms used in the mechanism shown in FIG. 5.
Figure 9:
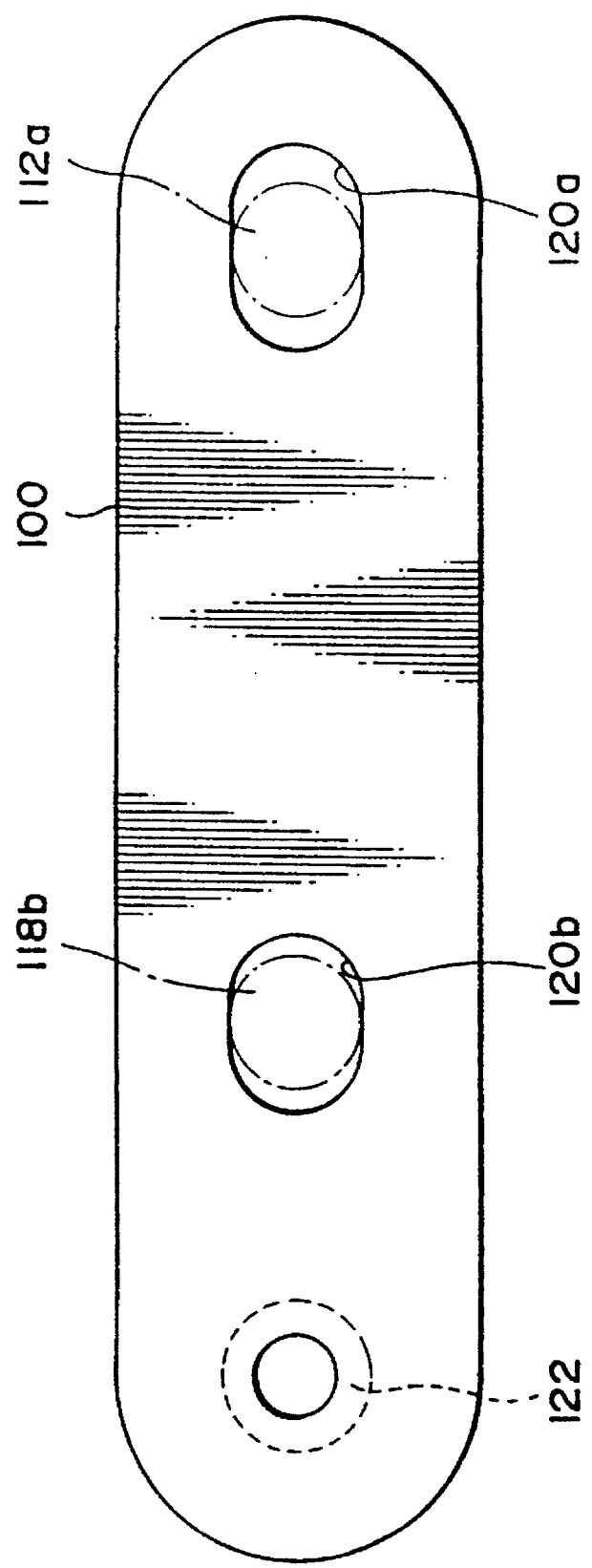

FIGS. 8 and 9 show enlarged views of the arm plates 98 and 100. On one side of the arm plate 98, in FIG. 8, an engaging hole 114a is formed. The dowel 110b engages the engaging hole 114a. A fulcrum dowel 118 is attached to the center of the arm plate 98. On the other side of the plate 98, another engaging hole 114b is formed. A dowel 118a engages the engaging hole 114b.

In FIG. 9, on one side of the arm plate 100, an engaging hole 120a is formed. The dowel 120a which is attached to arm plate 96 engages the hole 120a. A fulcrum dowel 122 is attached to the other side of the arm plate 100. The dowels 116 and 122 are slidably fitted in fulcrum holes 108a and 108b, respectively.

The picture size changing unit 56 as described above is assembled as follows. First, the dowels 116 and 122 are inserted in the holes 108a and 108b. Then, the light shielding plates 92 and 94, and the plate 96 are assembled in order. The dowel 110b is inserted in the hole 114a and then fitted in the guide groove 104b. The dowel 112a is inserted in the hole 120a and then fitted in the groove 104c. The dowels 118a and 118b are inserted in the hole 114b and 120b, and then engaged with the grooves 106a and 106b, respectively.

A shutter unit 90 is placed on the plate members assembled as above, and then fixed in the body 10 of the camera. Thus, the picture size changing unit 56 including the light shielding plates 92 and 94, operation plate 96, arm plates 98 and 100 is positioned between the panel member 82 and the shutter unit 90.

By moving the operation plate 96, the arm plates 98 and 100 rock about the dowels 116 and 122, respectively. Thus, the light shielding plates 92 and 94 slide up and down, as shown in FIG. 5.

Figure 10:
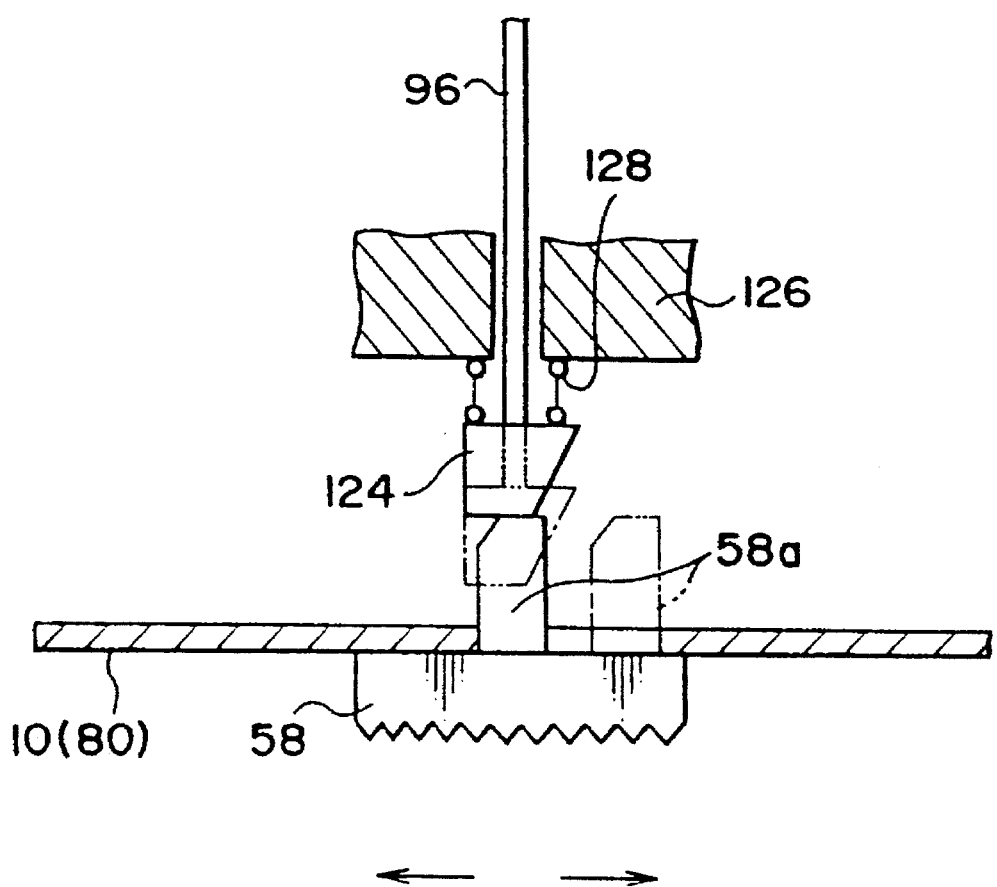
FIG. 10 shows a mechanism, accessible by an operator, used to switch the picture size change mechanism of FIG. 5.

The movement of the operation plate 96 in the direction parallel to the shorter side of the opening 88 is converted to movement of the light shielding plates 92 and 94. The movement of the operation plate 96 can be accomplished by using various mechanisms. In the present embodiment, a mechanism shown in FIG. 10 is employed.

On the bottom surface of the body 10, the picture size slide switch 58 is provided. The slide switch 58 is slidable in the width direction of the body 10. A depression block 124 is secured to the operation plate 96. The depression block 124 is located above the slide switch 58. Between the depression block 124 and a fixed portion 126 of the body 10, a coil spring 128 is inserted to bias the depression block 124 (i.e., the operation plate 96) toward the slide switch 58. The depression block 124 has a tapered surface 124 which engages with a projection 58a. In accordance with the position of the projection 58a, i.e., the position of the slide switch 58, the depression block 124 is located at an upper position (indicated by a solid line in FIG. 10) or a lower position (indicated by a dotted line in FIG. 10). When the depression block 124 is located at the upper position, the panoramic picture mode is selected. When the depression block 124 is located at the lower position, the full size picture mode is selected, since the block 124 is lowered due to the force of the coil spring 124.

In the present embodiment, the picture mode is switched between the 35 mm full size picture mode and the panoramic picture mode. However, any combination of picture size, e.g., 35 mm full size and high-vision size, can be employed.

Figure 11:
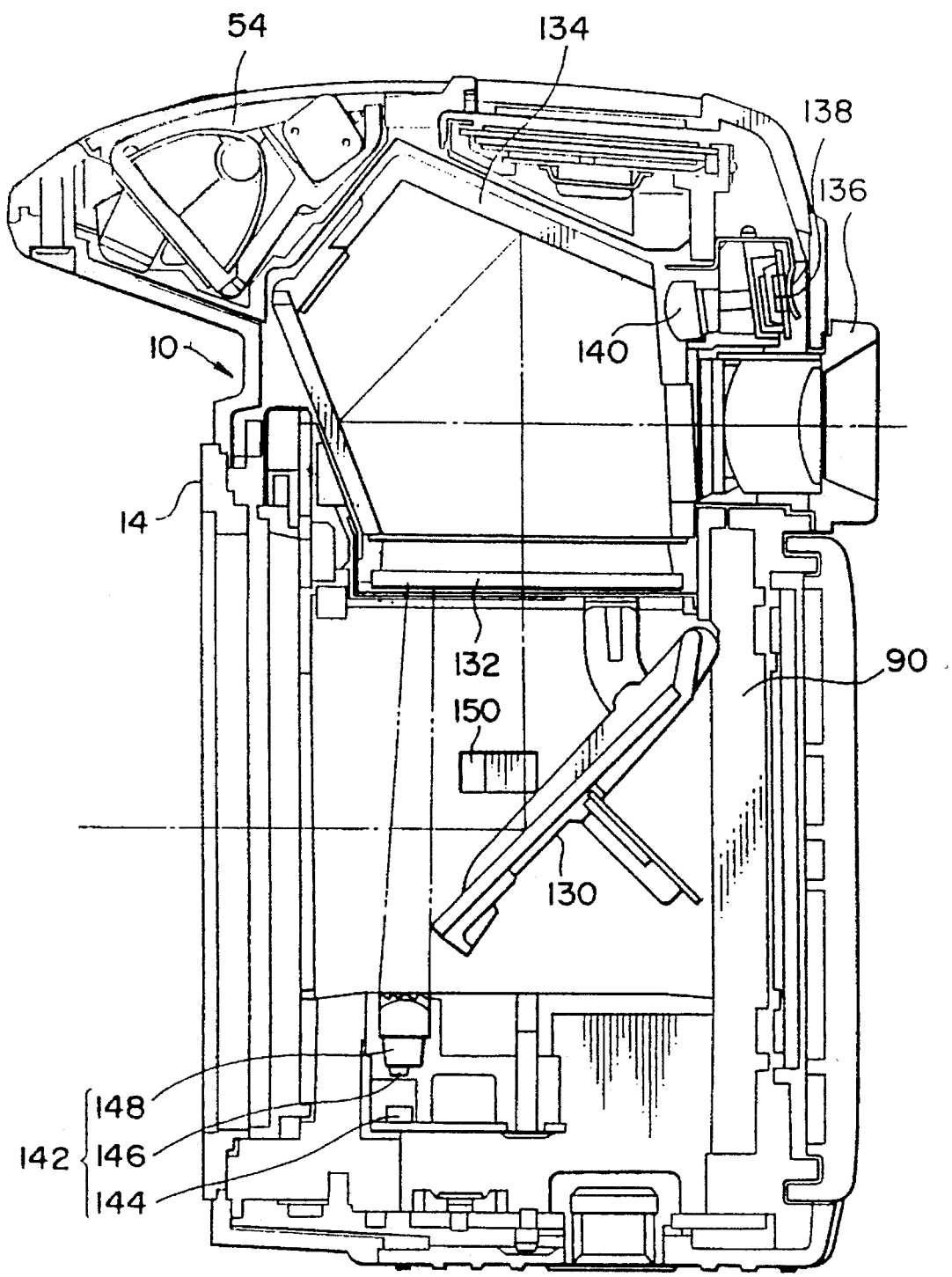
FIG. 11 shows a sectional side view of the camera shown in FIG. 1.

FIG. 11 shows a schematic sectional side view of the camera body 10. In front of the shutter unit 90, a main mirror (quick return mirror) 130 is provided. Above the main mirror 130, a focusing screen 132 is provided. An image formed on the focusing screen 132 is viewed with the finder optical system 136 via a pentaprism 134 arranged above the focusing screen 132. It is noted that the main mirror 130 should be raised up to allow light to be incident on the shutter unit 90. Then the shutter is opened to allow the film plane to be exposed to the light.

In the embodiment, as shown in FIG. 11, a photometry sensor 138 is provided above the finder optical system 136. The photometry sensor 138 detects the brightness of the focusing screen 132 through a photometry lens 140.

Figure 12:
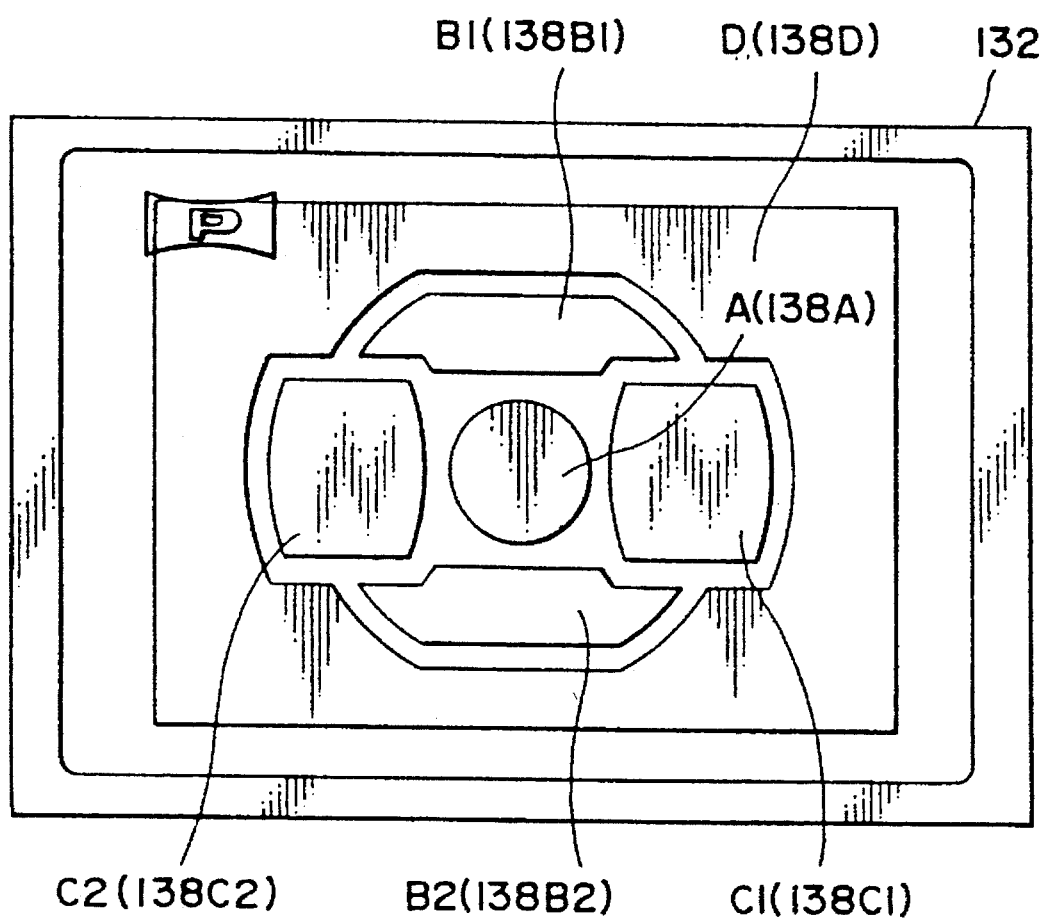
FIG. 12 shows a focusing screen and areas of the screen where brightness is detected.

Specifically, as shown in FIG. 12, the focusing screen 132 has six areas: a central circular area A; areas B1, B2, C1 and C2 which surround the central area A; and a peripheral area D. The photometry sensor 138 has six segment sensors: a segment sensor 138A for measuring the brightness of the area A: a segment sensor 138B1 for measuring the brightness of the area B1; a segment sensor 138B2 for measuring the brightness of the area B2; a segment sensor 138C1 for measuring the brightness of the area C1; a segment sensor 138C2 for measuring the brightness of the area C2; and a segment sensor 138D for measuring the brightness of the area D.

In the lower portion of the body 10, an indicator 142 is provided. The indicator indicates predetermined information when the panoramic picture mode is selected. The indicator 142 has a red LED 144, a predetermined image pattern, and a projection lens 148 for forming an image on the focusing screen 132. The image pattern is formed using a mask member 148 on which a transparent portion having a shape of a letter P is formed. This image pattern is projected as shown in FIG. 12, when the panoramic picture mode is selected.

The image pattern is projected such that it is outside an area of the focusing screen that corresponds to a panoramic picture mode frame size, but inside an area of the focusing screen corresponding to a full size picture mode frame size.

On a side wall inside the body 10, a TTL light receiving element 150 is provided. The light receiving element 150 is arranged such that it receives light reflected by the full size of the film surface when the film surface is exposed to light. Thus the light incident on the film surface and reflected by the film surface is directly measured by the TTL light receiving element 150.

FIG. 13 is a block diagram of the control system of the camera.

The photometry sensor 138 is connected to a body CPU 20 via a photometry circuit 152 and an A/D converter 154. The photometry circuit 152 logarithmically compresses the electrical signal outputted by the photometry sensor 138. The compressed signal is converted into the digital photometry signal by the A/D converter 154. The body CPU 20 performs a calculation based on the A/D converted photometry signal and film sensitivity data outputted by a film sensitivity setting unit 158, and obtains the shutter speed and aperture value required for photographing. The CPU 20 then controls the shutter unit 90 and a diaphragm mechanism through an exposure controller 158 to execute photographing. Further, the CPU 20 controls a motor drive circuit to raise or lower the main mirror 130 when photographing is executed, and controls a winding motor to wind the film after photographing.

Between the body CPU 20 and a lens CPU, data communication is performed. Data is exchanged through the terminals 18 provided on the mount 14, and terminals provided on a mount surface of the lens (not shown). Further, there is provided a focal length detecting unit for detecting the current focal length of the lens, and transmits the data related to the focal length to the lens CPU.

The body CPU 20 controls the entire system. The body CPU 20 has a controller 20a, an operation device 20b, and a timer 20c. The controller 20a includes a ROM (read only memory) containing programs and a RAM (random access memory) for temporarily storing data. The operation device 20b executes calculations such as an AF (autofocus) calculation, a PZ (power zoom) calculation, an AE (auto exposure) calculation, and the like. An EEPROM 160 is connected via a communication controller 22 to the controller 20a. The EEPROM 160 stores variables, various coefficients, and various functions used for the AF calculation, PZ calculation, and AE calculation.

When an external strobe 162 is attached to the hot shoe 42, it is connected to the body CPU 20 via the communication controller 22. Further, a light emission control terminal is connected to a TTL integration circuit and to the body CPU 20 so that the light emission of the strobe 62 is controlled thereby. The external strobe 162 has an internal battery 162a, xenon tube 162b, and flash circuit 162c for driving the xenon tube to emit light with use of the battery 162a. The flash circuit 162c is controlled by the body CPU 20.

The built-in strobe 54 is connected to the body CPU 20. The built-in strobe 54 has a xenon tube 54a, and a flash circuit 54b. The flash circuit drives the xenon tube 54a to emit light with the use of a built-in battery 164. The flash circuit 54b is controlled by the body CPU 20.

Figure 14:
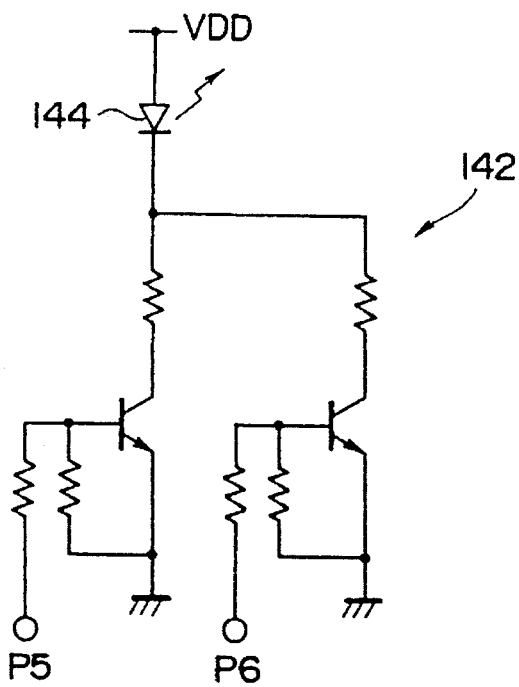
FIG. 14 shows a drive circuit used to drive an LED that provides a light source for projecting a predetermined image on the focusing screen.
Figure 15:
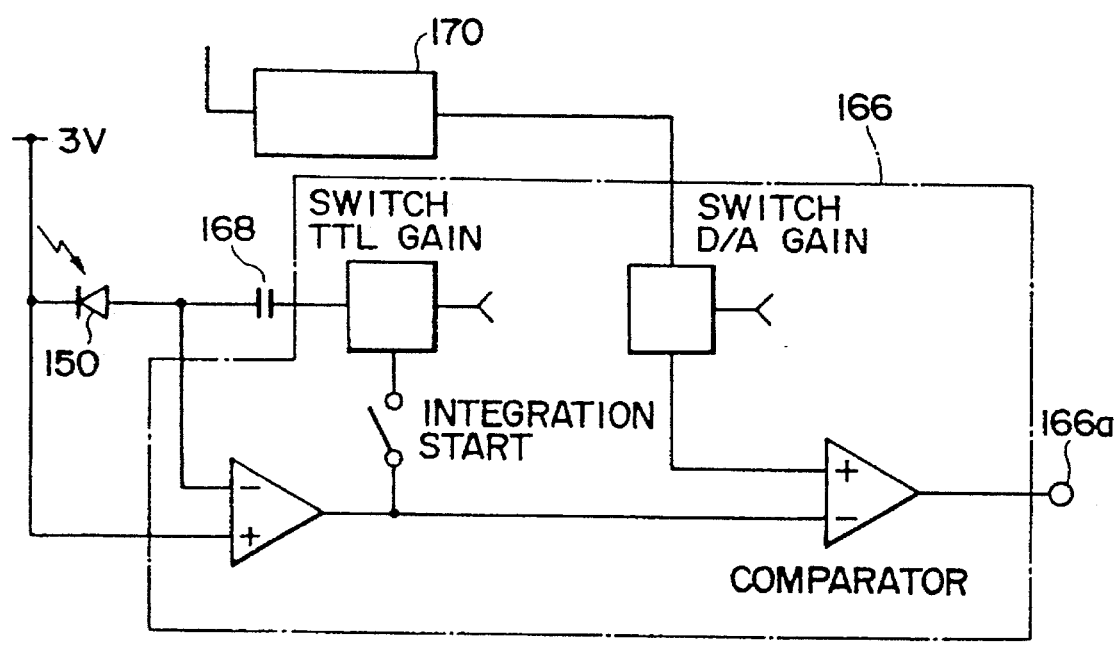
FIG. 15 is a schematic of a TTL integration circuit used in the camera shown in FIG. 1.

FIG. 14 shows a circuit of the indicator 142. The indicator 142 has a red LED 144. The cathode of the red LED 144 is connected to control terminals P5 and P6 of the body CPU 20. The body CPU 20 controls the red LED 144 in such a fashion that (1) when it is detected that the brightness of the focusing screen 132 is low (i.e., dim), one terminal P5 is turned ON to hold the intensity of the light emitted by the LED 144 at a relatively low level, and (2) when it is detected that the brightness of the focusing screen 132 is high (i.e., bright), both the terminals P5 and P6 are turned ON so that the intensity of light emitted by the LED 144 becomes relatively high. In other words, the intensity of light emitted by the LED 144 is controlled to change in accordance with the brightness of the focusing screen 132.

The TTL light receiving element 150 is connected to the body CPU 20 via the TTL integration circuit 166. A condenser 168 for integrating the light received by the TTL light receiving element 150 is attached to the TTL integration circuit 166. A D/A converter 170 for receiving a control signal from the body CPU 20 and converting it to an analog signal is connected to the TTL integration circuit 166. When the integrated light amount reaches a predetermined value, a quench signal is outputted from a terminal 166a. The terminal 166a is connected to the flash circuit 54b. Upon receipt of the quench signal, light emission of the strobe 54 stops. Similarly, another terminal for outputting another quench signal is connected to the flash circuit 162c via terminals provided at the hot shoe 42.

As explained above, the body CPU 20 controls the amount of light emitted by the strobe 54 based on the amount of light incident on the film plane.

The operation of the camera embodying the present invention will be described below with reference to the drawings.

The control sequence has two main loops: a POFF loop and a PON loop. The POFF loop corresponds to a stand-by state of the camera system, and the PON loop corresponds to an operating state of the camera system,

MAIN ROUTINE

Figure 16:
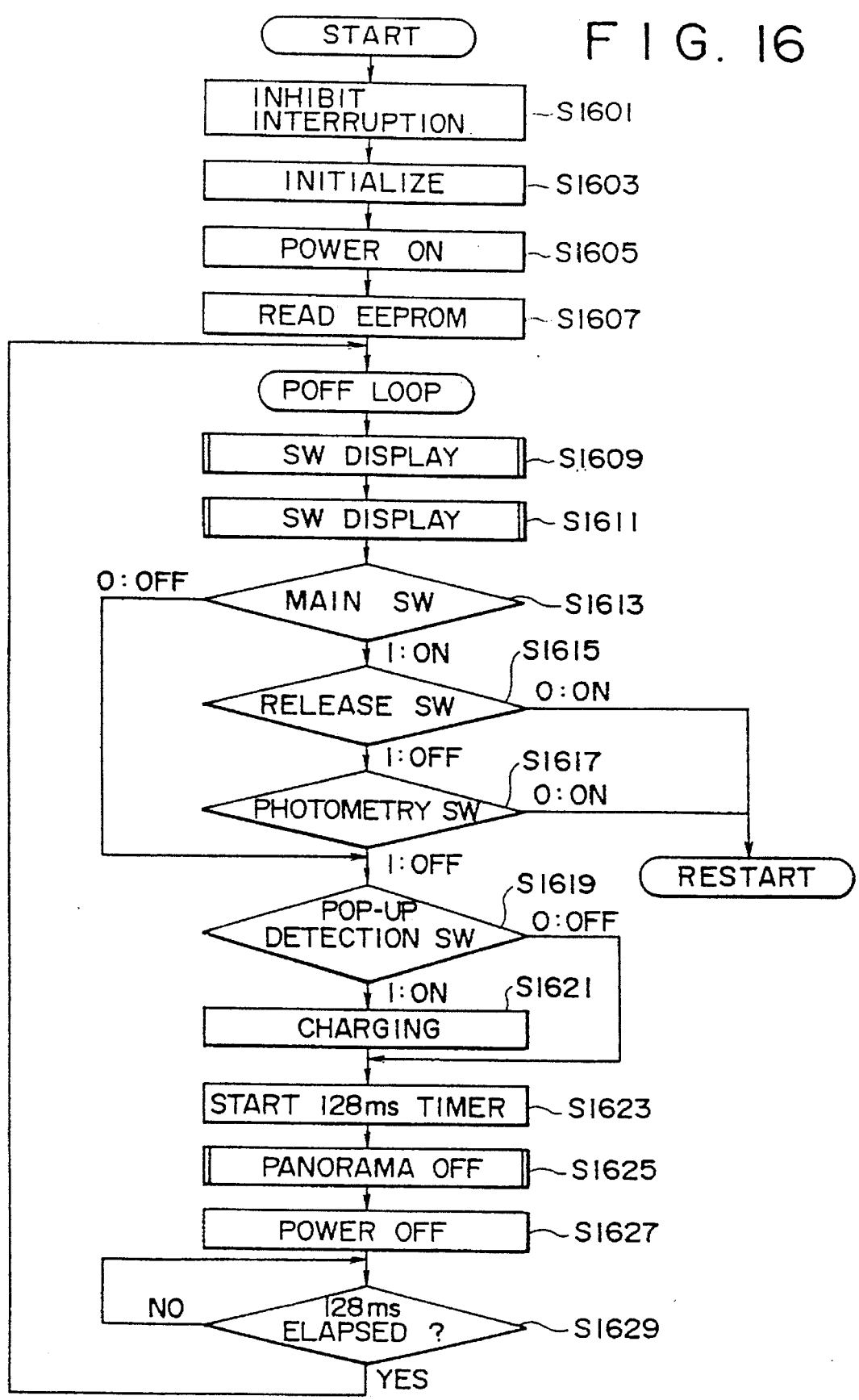
FIG. 16 is a flowchart showing the main routine of the camera shown in FIG. 1.

FIG. 16 is a flow chart showing a main routine of the camera system. The flow starts when a battery is inserted in the camera 10. When the battery is inserted in the camera 10, all of the interruption processes are inhibited, and an initialization of the system is executed. The initialization includes the initializing of flags, RAM, registers, and the performance of a checksum on the ROM (S1601, S1603). In step S1605. once power is supplied to all the hardware in the camera 10, the data stored in the EEPROM 106 is read out and written to the RAM of the CPU 20 (S1607). After the above initializing sequence is completed, control goes to the POFF loop which is repeatedly executed while the main switch 76 is OFF.

POFF LOOP

In the POFF loop, a SW (switch) operation display loop is called. In the SW operation display loop, the states of the switches are transmitted to the CPU, and then information related to the states of the switches are displayed ont he LCD panel 34 (S1609, S1611). The SW operation display loop is called twice at an interval of 128 ms. If the main SW is "0" (i.e., if the slide switch S6 is located at OFF position), control loops in the POFF loop. If the pop-up button 32 is depressed, the charging of the built-in strobe is initiated (S1621). Then the indicator 142 is turned OFF (S1625), and the power supply to most of the hardware is turned OFF (S1627). When a timer which has started at step S1623 counts 128 ms, control goes back to step S1609.

Even if the main switch is set to "1", if both the release switch 62 and the photometry switch 60 are turned OFF, the POFF loop will be executed. If the photometry switch 60 or the release switch 62 is turned ON, control diverges to a RESTART routine shown in FIGS. 17A and 17B.

RESTART ROUTINE

Figure 17A:
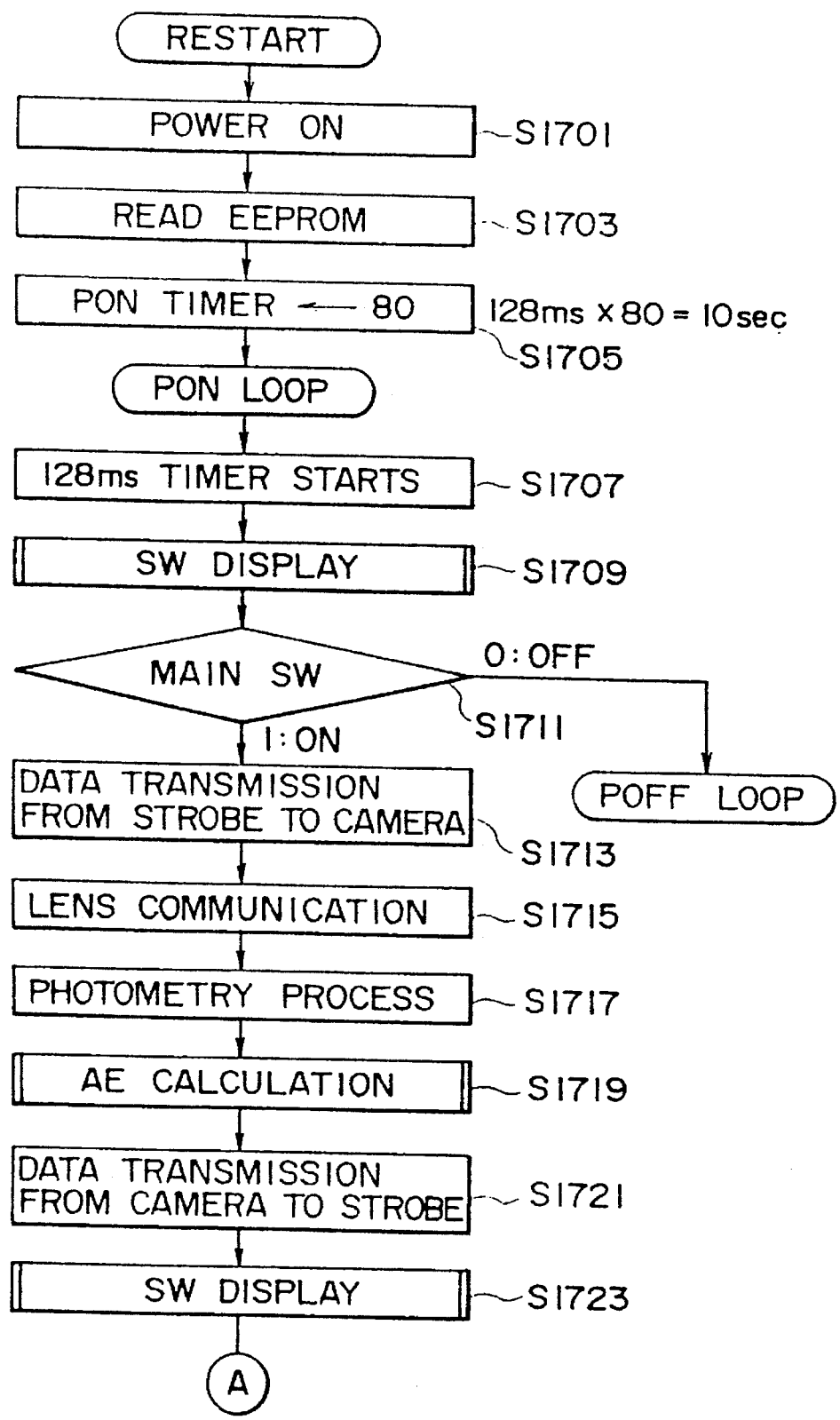
FIGS. 17A and 17B show a Restart routine used in the camera shown in FIG. 1.
Figure 17B:
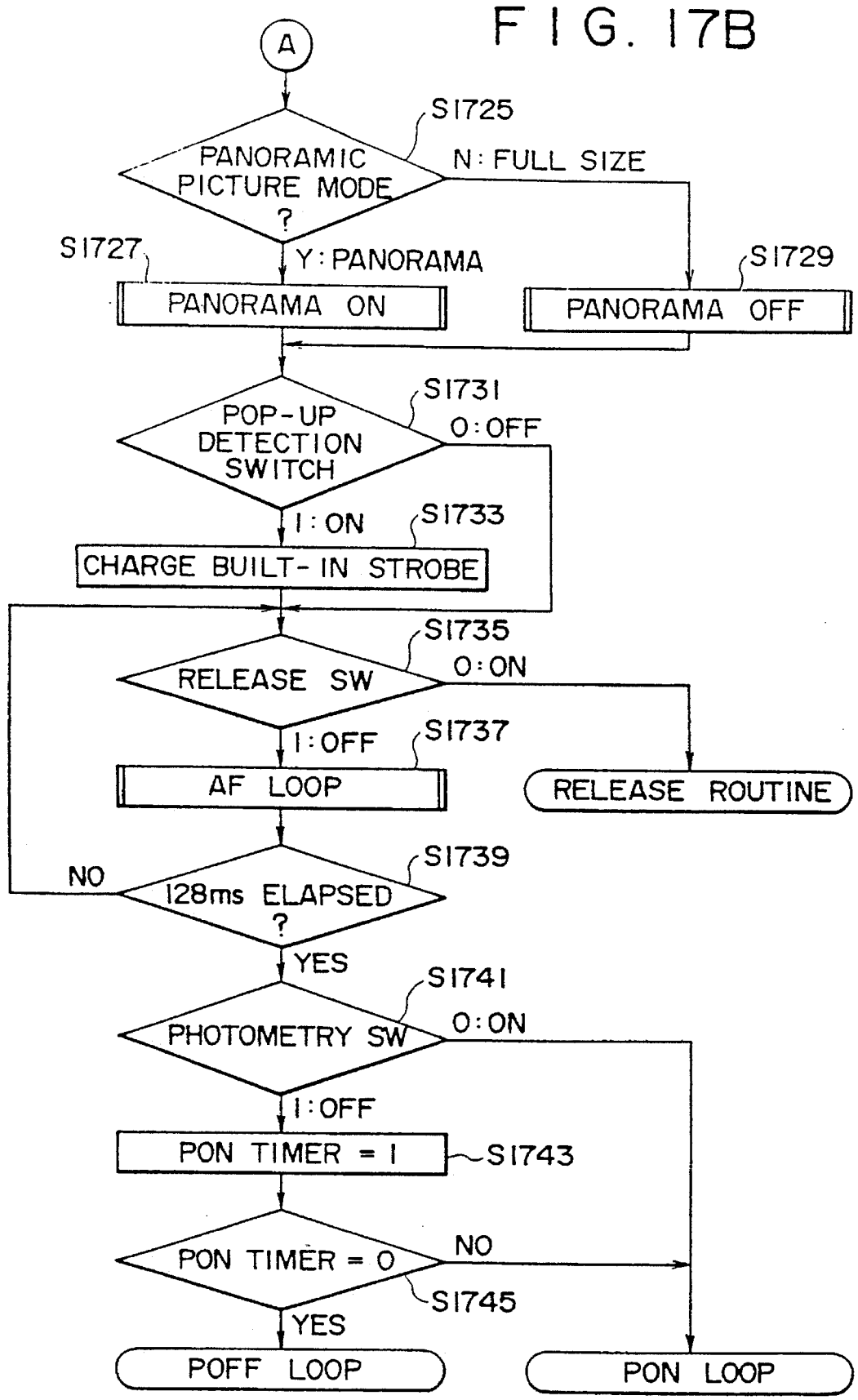

FIGS. 17A and 17B show the RESTART routine. The RESTART routine is called when the main switch is set to "1", and the photometry switch 60 or the release switch 62 is set to "1". In other words, the RESTART routine is called when the amin switch is set to "1", and the shutter button is halfway or fully depressed. First, power is supplied to all the hardware, and then data stored in the EEPROM is transmitted to the RAM (S1703, S1705). The number of repetitions is sent to the PON timer in step S1705, and then control goes to the PON loop.

PON LOOP

In the PON loop, communication between the camera body 10 and the photographing lens 12, the built-in strobe 54, and the external strobe 162 are executed. Further, a photometry operation and an AE operation for calculating Tv/Av values are executed.

The timer is started (S1707) to regulate the period (128 ms) of one cicyle of the PON loop. In step S1709, information related to states of the switches are displayed on the LCD panel 34 (S1309). If the main switch is set to "1", data transmission from the built-in strobe 54 and the external strobe 162 to the camera body 10, and communication between the photgraphing lens 12 and the camera body 10 is performed (S1713, S1715). Further, in the lens communication in step S1715, data (EXTP) related to the exit pupil position is transmitted as an inverse number (1/EXTP) from the lens 12 to the camera body 10.

Then, a photometry process is executed (S1717). In the photometry process, brightness data (BVADrB1, BVADrD, BVADrC2, BVADrC1, BVADrA, BVADrB2) are calculated based on values B1AD, D_AD, C2AD, C1AD, A_AD, and B2AD which are the A/D converted values of output values of each segment sensor (light receiving element 138). An AE calculation is performed in S1719 based on the calculated brightness data. The photometry processes in S1717, and the AE calculation in S1719 are subroutines which will be described later in detail.

In accordance with the calculation result, predetermined data is transmitted from the camera body 10 to the built-in strobe 54 and the external strobe 162 (S1721). Then, visual indications related to the calculation result are displayed in S1723.

If the panoramic picture mode is selected (Yes: S1725), the letter "P", indicating that the panoramic picture mode is selected, is projected onto the focusing screen 132 (S1727). If the full size picture mode (the normal 35 mm picture mode) is selected, the indication of the letter "P" is inhibited (S1729).

If the built-in strobe pop-up detection switch 72 is turned ON, the strobe 54 is charged (S1731, S1733). If the shutter button 26 is fully depressed (release SW="0": S1735) the releasing process is executed. When the release switch 62 is OFF (release SW="1": S1731), the AF loop is called. The AF loop is repeatedly called until the 128 ms timer has finished counting and the release switch is OFF (S1735–S1739). After 128 ms has passed, and the photometry switch SW is turned OFF (is set to "0"), the PON loop is repeated by the number of times set in S1705, and the control goes to the POFF loop (S1743–S1745). Otherwise, the PON loop is repeated.

Release Routine

Figure 18:
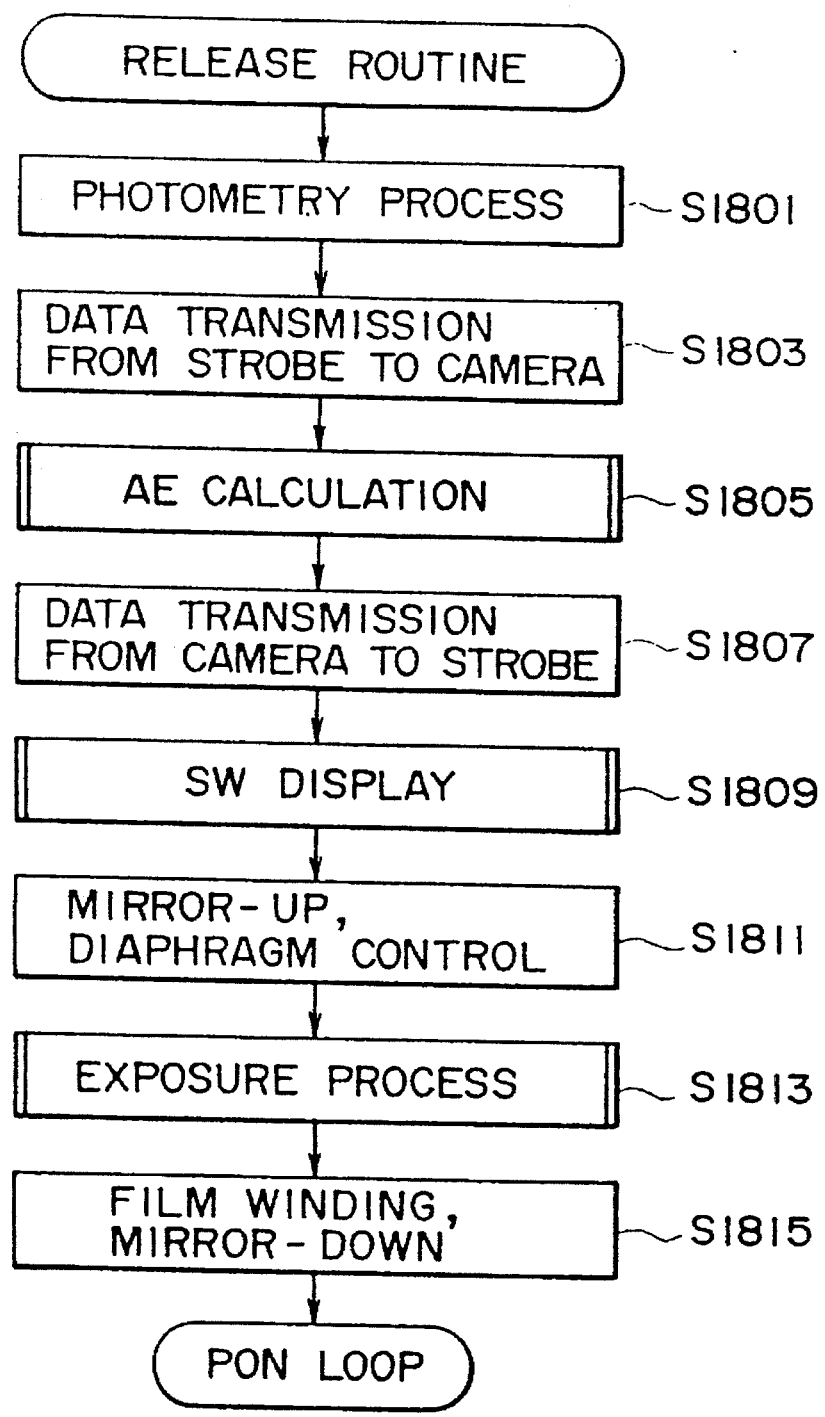
FIG. 18 is a flowchart showing the release routine used in the camera shown in FIG. 1.
Figure 19A:
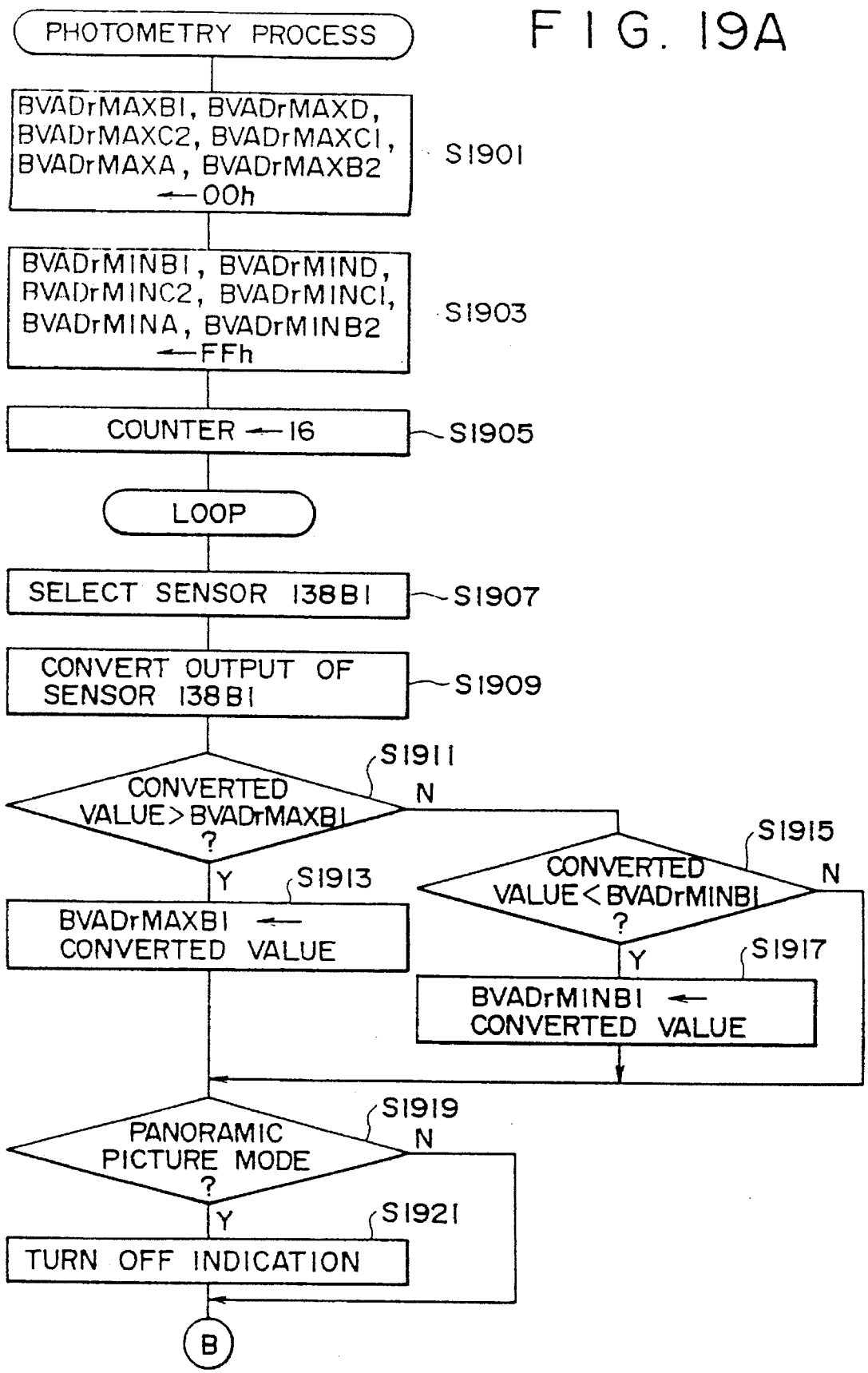
FIGS. 19A–19D show a flowchart of the photometry system used in the camera shown in FIG. 1.
Figure 19B:
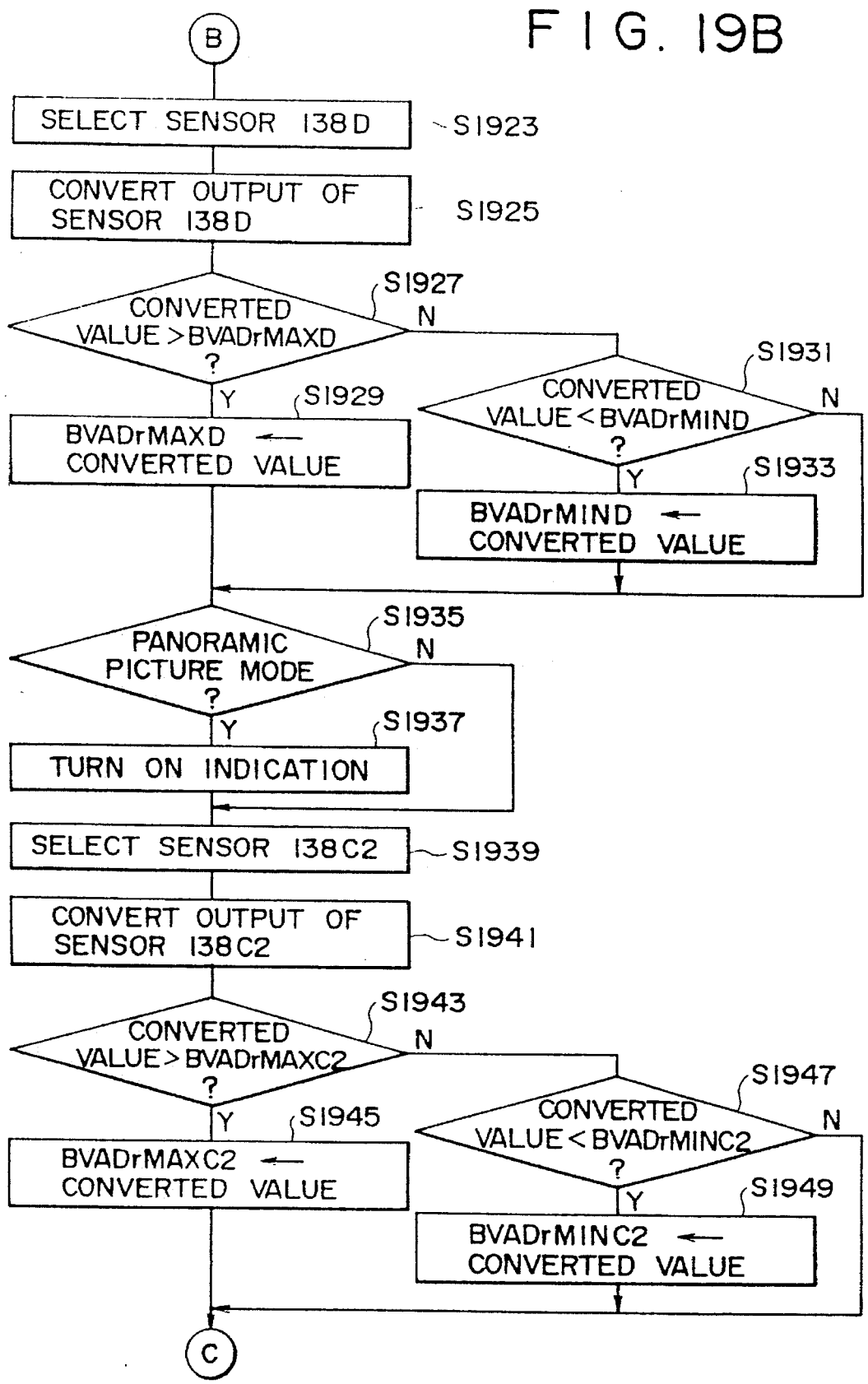
Figure 19C:
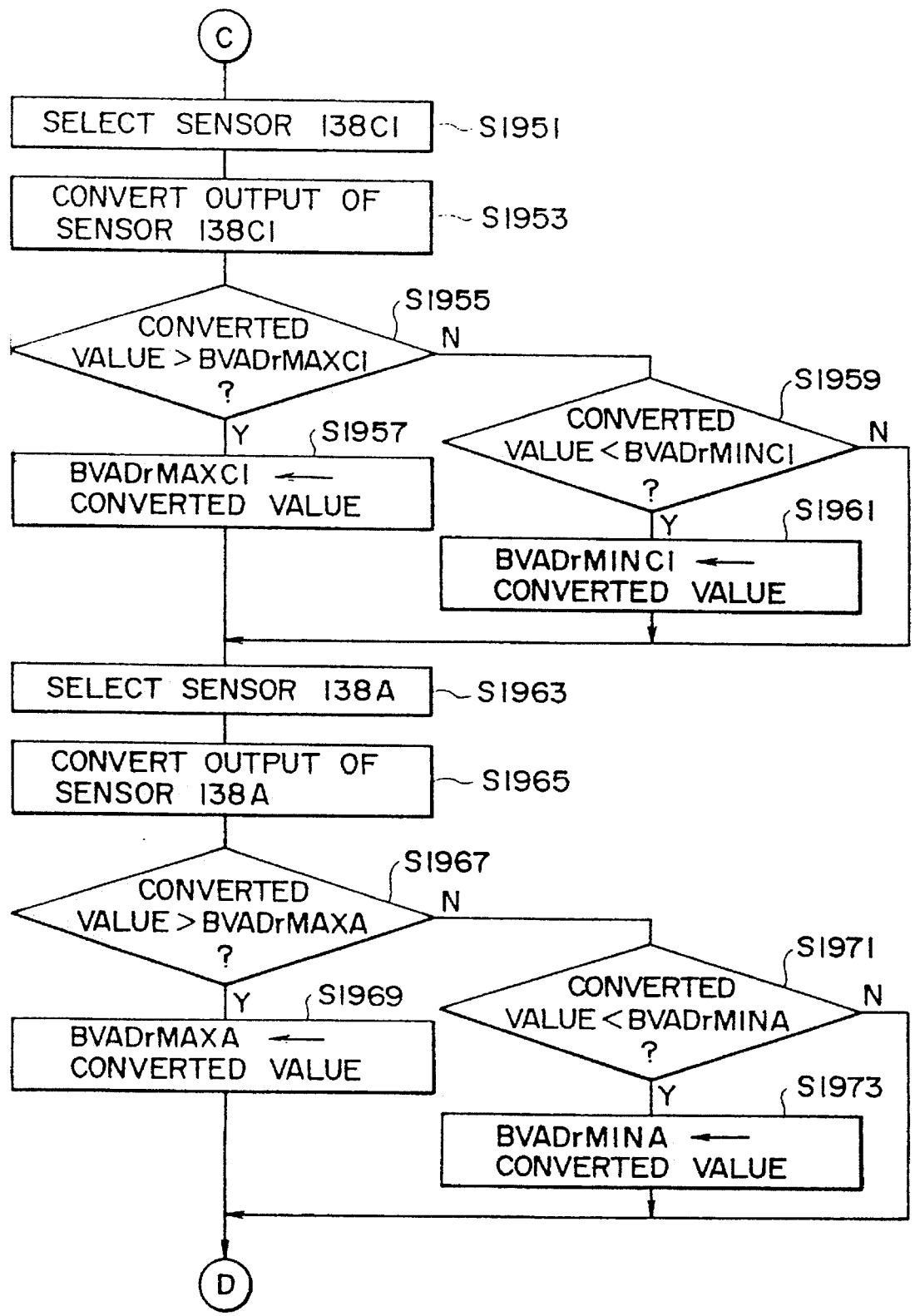
Figure 19D:
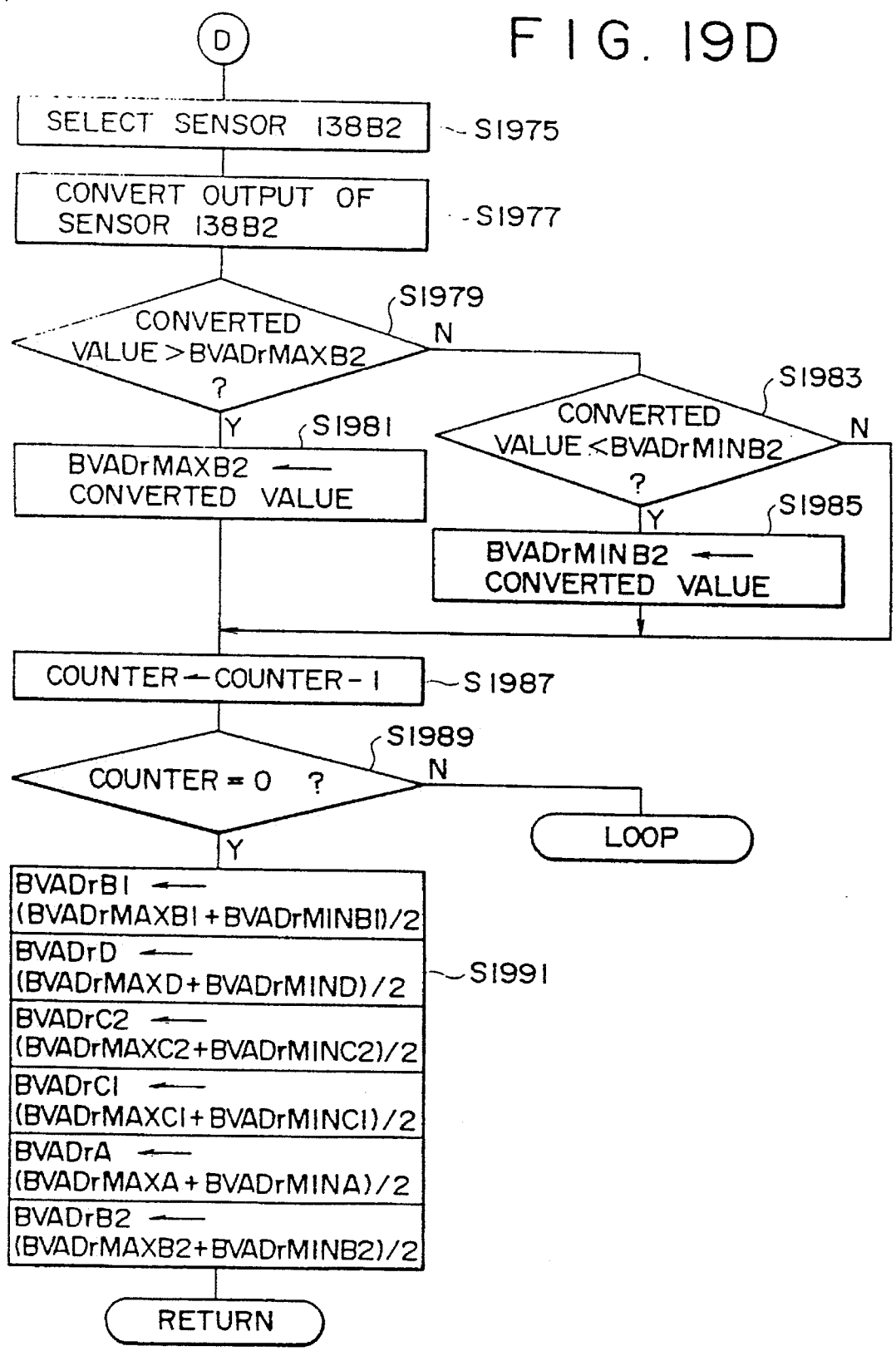

FIG. 18 is a flowchart illustrating the release routine. In the release routine, the photometry process (S1801), data transmission from the built-in strobe 54 or the external strobe 164 of the camera to the camera body 10 (S1803), and the AE calculation (S1805), data transmission in accordance with the calculation result from the camera body 10 to the built-in strobe 54 and the external strobe 164, are executed (S1807). After the indications related to the states of the switches have been displayed in S1809, the exposing sequence is performed. The exposing sequence includes the mirror up and diaphragm control (S1811), the film exposure process (S1813), film winding, and then the mirror down process (S1815).

Photometry Process

FIGS. 19A–19D show a flowchart illustrating the photometry process which is called in S1717 in FIG. 17A and in S1801 in FIG. 18.

In the photometry process, the segment sensors 138B1, 138D, 138C2, 138C1, 138A, and 138B2 are driven in turn, and the measurement is executed sixteen times. The output of each segment sensor at each actuation is converted into a digital value. By using the converted digital values, brightness data for each segment sensor segment can be determined.

In the photometry process, data BVADrMAXA, BVADrMAXB1, BVADrMAXB2, BVADrMAXC1, BVADrMAXC2, BVADrMAXD are respectively set to 00 h (S1901). The data BVADrMAXA, BVADrMAXB1, BVADrMAXB2, BVADrMAXC1, BVADrMAXC2, BVADrMAXD are data indicative of the maximum values of the inverted A/D converted values of the outputs of the segment sensors 138A, 138B1, 138B2, 138C1, 138C2, and 138D. In step S1903, data BVADrMINA, BVADrMINB1, BVADrMINB2, BVADrMINC1, BVADrMINC2, BVADrMIND are all set to FFh. The data BVADrMINA, BVADrMINB1, BVADrMINB2, BVADrMINC1, BVADrMINC2, BVADrMIND are data indicative of the minimum values of the inverted A/D converted values of the outputs of the segment sensors 138A, 138B1, 138B2, 138C1, 138C2, and 138D. The number of repetitions, "16", is set in COUNTER (S1905), then control goes to a LOOP routine. In the LOOP routine, the sensor 138B1 is selected (S1907). The output of the sensor 138B1 is converted into a digital value (S1909). Then, the digital value is compared with the maximum value of BVADrMAXB1 (S1911). If the A/D converted value is greater than value BVADrMAXB1 (Y:S1911), BVADrMAXB1 is set to the A/D converted value (S1913). If the digital value is smaller than minimum value BVADrMINB1 (Y:S1915), BVADrMINB1 is set to the digital value. If the digital value is not greater than the minimum value BVADrMINB1, control goes out of the calculation process for the sensor 138B1.

After the calculation for sensor 138B1 is completed, control goes to the calculation process for the sensor 138D. However, prior to the calculation process, it is detected whether the panoramic picture mode is selected (S1919). If the panoramic picture mode is selected, the letter P is indicated by the indicator 142. The indication of the letter P may affect the measurement of the brightness by the sensor 138D. Therefore, in step S1921, the indication of the letter P is turned OFF. Thereafter, the calculation process regarding the brightness detected by the sensor 138D is executed. If the full size picture mode is selected, i.e., the projecting unit 142 does not indicate any information, then the step S1921 is skipped.

In steps S1923 through S1933, calculations similar to steps 1907 through 1917 described above, are executed, and the maximum value BVADrMAXD and the minimum value BVADrMIND related to the brightness measured by sensor 138D are obtained.

After the calculation for the segment sensor 138D is completed, if the panoramic picture mode is selected, the indication of the letter P which was turned OFF in step S1937 is turned ON, since the indication only affects the measurement by the sensor 138D. If the full size picture mode is selected, step S1937 is skipped.

In steps S1939 through S1949, steps S1951 through S1961, in steps S1963 through S1973, and steps S1975 through S1985, the maximum values (BVADrMAXC2, BVADrMAXC1, BVADrMAXA, BVADrMAXB2) and the minimum values (BVADrMINC2, BVADrMINC1, BVADrMINA, BVADrMINB2) with respect to the sensors 138C2, 138C1, 138A, and 138B2 are obtained, respectively, in a manner similar to steps S1907 through S1917 described for sensor 138B1.

In step S1987, the counter is decremented by 1 and then it is determined whether the counter is greater than 0 (S1989). If counter is not equal to 0, control goes back to the start of the loop, and the above described process of brightness measurement and calculation is repeated. The above-described process is repeated 18 times to determine the maximum and minimum values.

In step S1991, brightness data values are calculated by averaging the maximum and minimum values for each segment sensor. After the brightness data values are obtained, control returns to where the subroutine PHOTOMETRY PROCESS was called.

As described above, if the panoramic picture mode is selected, when a sensor is active, the indication which is considered to effect the measurement by the sensor, is turned OFF. Thus, an accurate measurement by the sensor can be achieved.

When the measurement by sensor 138D is being executed, the time period that the indication of letter P is OFF is very short—100 µs —which is imperceptible to the operator of the camera.

AE Calculation Routine

Figure 20A:
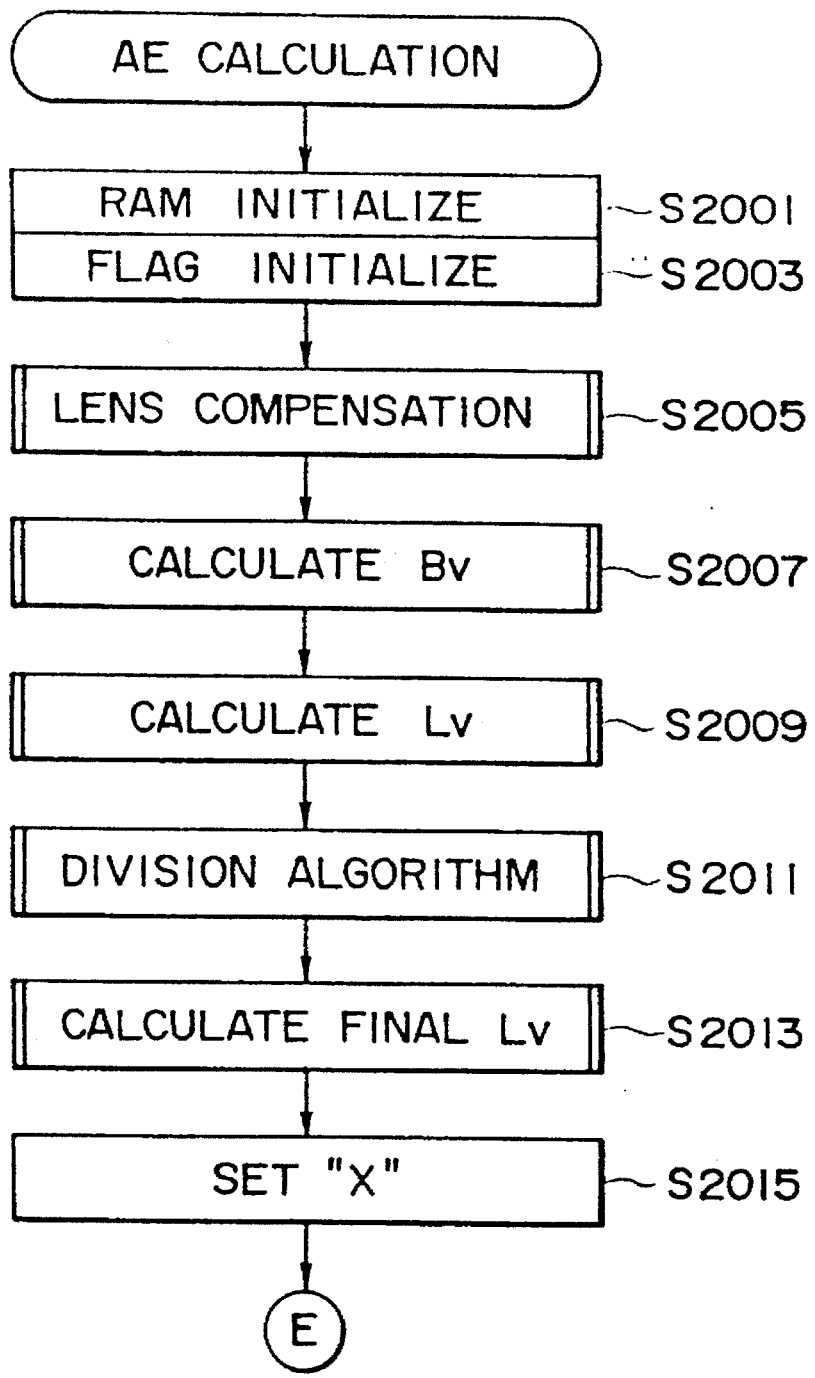
FIGS. 20A and 20B show an AE calculation routine used in the camera of FIG. 1.

The AE calculation routine will be described with reference to FIGS. 20A and 20B. The subroutine AE calculation is called in step S1719 in FIG. 17A, and step S1805 in FIG. 18.

The camera of the present embodiment has a plurality of photographing modes:

(a) Green mode (automatic control mode directed to beginners);

(b) Programmed calculation mode (shutter speed and aperture value are automatically determined in accordance with a program);

(c) Automatic calculation mode (including a shutter speed priority mode and an aperture priority mode);

(d) Manual mode (shutter speed and aperture are manually set); and (e) Bulb mode.

In the AE calculation process, a RAM of the body CPU 20 is initialized (S2001), and the flags to be used in the calculation are set to default values (S2003). In step S2005, a subroutine Lens Compensation is called, in which a compensation calculation is executed based on the lens data inputted into the CPU 20 in step S1715 in FIG. 17A. In step S2007, the brightness data values are converted into brightness values appropriate for calculation. In step S2009, luminance values for each sensor are calculated based on the brightness values obtained in step S2007, and the compensation values obtained in step S2005. One optimum luminance value is obtained in accordance with a predetermined algorithm (described later) from the luminance values calculated for each sensor. In step S2013, the final luminance value is determined based on the calculated luminance value Lv, the speed value Sv, and the exposure compensation value Xv which is set by the photographer. In this specification, the luminance value Lv is used. The luminance value Lv is an exposure value when the speed value Sv is fixed to a predetermined value. In other words, the luminance value Lv is the sum of the brightness value and a predetermined fixed value. In step S2015, a variable X is set to a value corresponding to the currently selected AE mode.

In steps S2017 through S2025, a time value Tv and an aperture, value Av are determined in accordance with the variable X (i.e., the selected AE mode-Green mode not shown). In step S2027, an EE pulse for controlling the diaphram is calculated. In step S2029, data required for operation of the external strobe 162 is set. In step S2031, a TTL data setting routine is called. In the TTL data setting routine, a level of an amount of light is determined, which is used to control the timing of the outputting of a quench signal. Thereafter, control returns to where is was called.

PANORAMA Indication ON

FIG. 21 shows a subroutine when the panorama indication is ON. The LED is brightly on dimly lit in accordance with the brightness of the object. Control terminal P6 indicates whether the LED is to be brightly lit (P6=ON) or dimly lit (P6=OFF), and terminal P5 corresponds to ON or OFF of the LED. As shown in FIG. 21, if the calcualted brightness BvD with respect to the sensor 138D is equal to or greater than 10.5 (Ev) while the LED is dimly lit, it is determined that area D of the focusing screen corresponding to the sensor 138D is bright, and terminals P5 and P6 are both set to ON. Thus, the LED is brightly lit. If the BvD is less than 10.5 (Ev), then the lED is maintained in its dimly lit condition (i.e., P5=ON, p6=OFF). Note that in the present specification, the values used in the APEX operations are the values obtained when the sensitivity of a film is ISO=100 (Sv=6).

Figure 22:
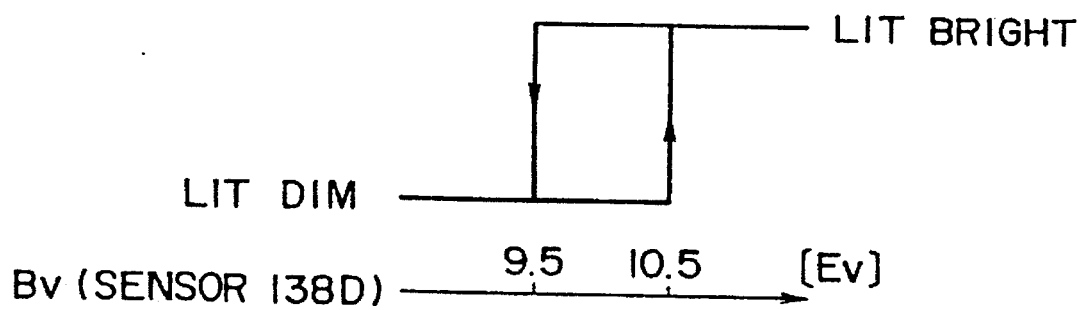
FIG. 22 shows the hysteresis of the changing of the brightness level of the LED as controlled by the subroutine of FIG. 21.

If the calculated brightness BVD is less than 9.5 (Ev) while the LED is brightly lit, terminals P5 and P6 are set to ON and OFF respectively, and the LED is then dimly lit. If the BvD is equal to or greater than 9.5 (Ev), the lED is maintained in its brightly lit condition. In other words, a threshold value required to change the brightness of the LED from dim to bright is 10.5 (Ev), and a threshold value required to change the brightness condition from bright to dim is 9.5 (Ev). FIG. 22 shows the above-described hysteresis of the brightness of the LED. If P5 is set to ON, the letter P is projected on the focusing screen 132. The brightness of the projected letter is brighter when P6 is set to ON than when P6 is set to OFF. After the terminals P5 and P6 are set, control returns to where the subroutine was called from.

PANORAMA INDICATION OFF

Figure 23:
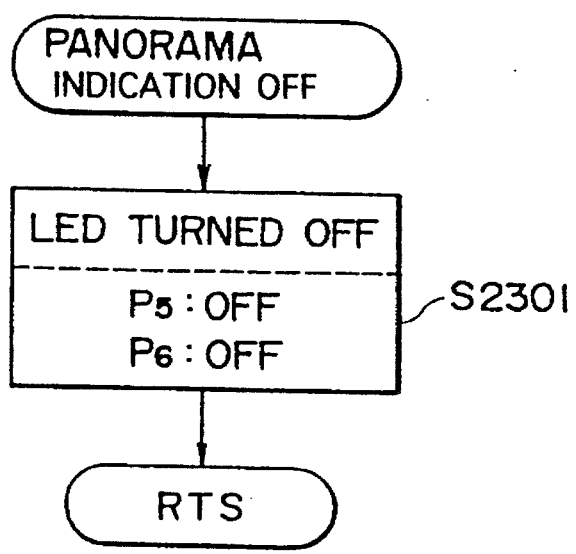
FIG. 23 shows a subroutine for turning the LED, shown in FIG. 14, OFF.

FIG. 23 shows a subroutine when the panorama indication is turned OFF. In this routine, terminals P5 and P6 are set to OFF to turn OFF the LED (S2301), and control returns to where the subroutine was called from.

EXPOSURE ROUTINE

Figure 24:
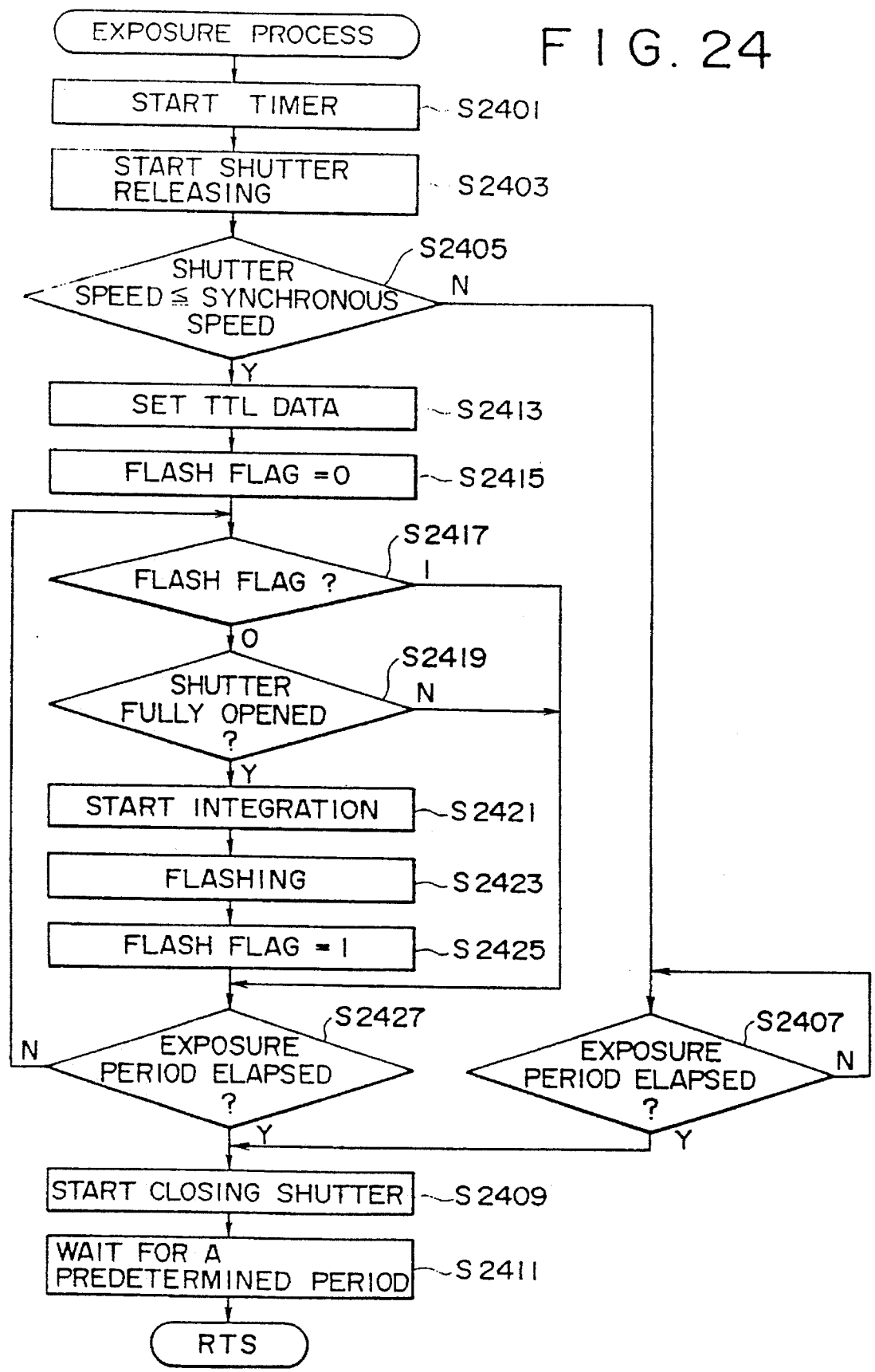
FIG. 24 is a flowchart of the exposure subroutine used in the camera shown in FIG. 1.

FIG. 24 shows a flowchart illustrating an exposure routine which is called at step S1813 in FIG. 18.

In the exposure routine, a shutter timer starts measuring time (S2401). Then, the shutter is opened (S2403). If the shutter speed is greater than a synchronous speed (No:S2405), the TTL flash control is not executed. After the exposure period has passed (Y:S2407), the shutter is closed (S2409), and paused for a predetermined period (S2411). Then, control returns to S1813.

If the shutter speed is equal to or smaller than the synchronous speed, the TTL data (including data related to the output timing of the quench signal, such as TTL_D/A value, TTL gain) is inputted during the lens communication (S2413). In step S2415, the flag indicating that the strobe has flashed is set to 0 (zero). In steps S2417 through S2427, the flashing of the strobe is controlled. When the shutter is fully opened (Y:S2419), TTL integration starts with the use of the light receiving element 150. In S2423, the strobe is controlled to emit light. When the integrated light amount reaches a predetermined amount, the light emission of the strobe is finished, and the flag indicating the strobe flashing is set to 1 (S2425). Then, steps S2417 through S2427 are repeated until the exposure period has passed, at which time the shutter is closed (S2409).

As shown in FIG. 24, the light emission of the strobe is executed once during one operation of the exposure routine. Light emission of the strobe is controlled with a start signal and the quench signal. These signals are applied to the terminals of the hot shoe 42 independent of whether the external strobe 162 is attached to the hot shoe 42. The signals are applied to the strobe 54 only when the pop-up detection switch 72 is ON.

Division Algorithm

Figure 25A:
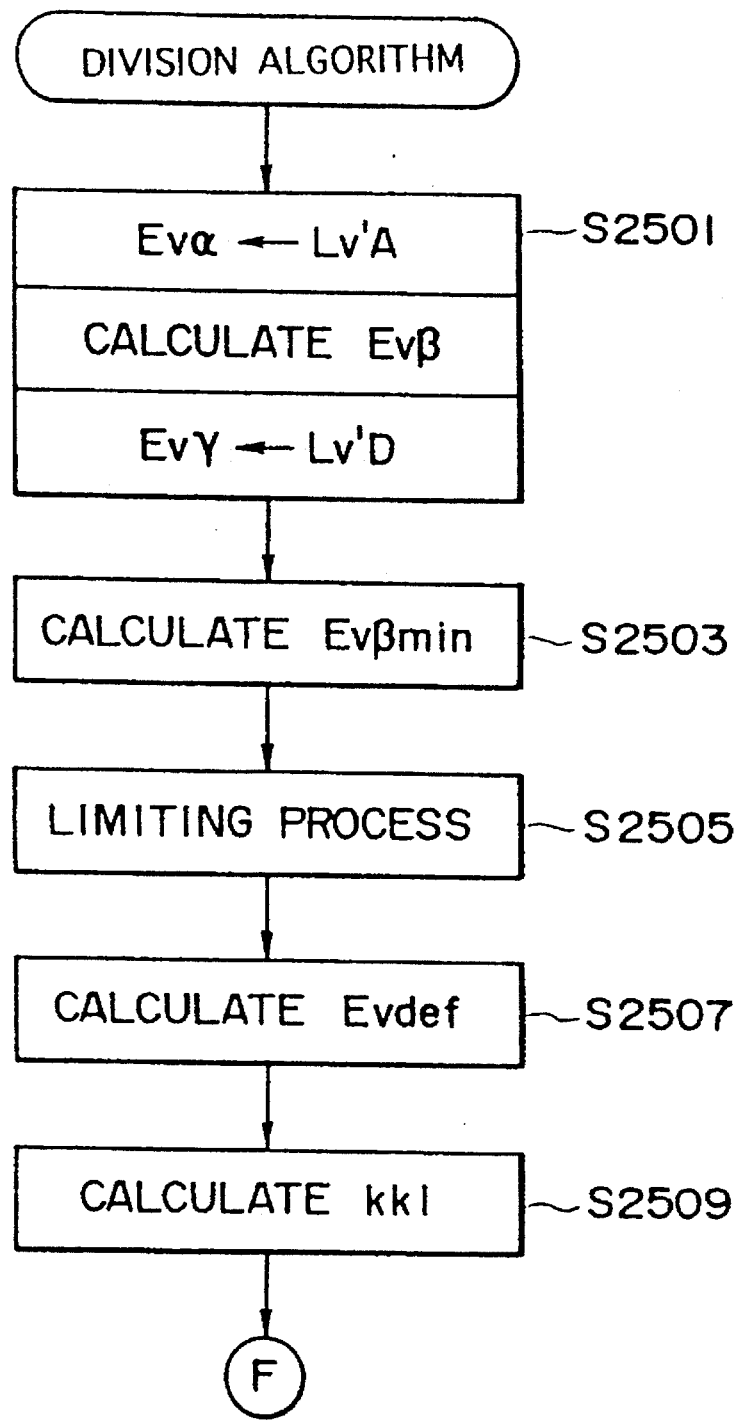

The division algorithm will be described with reference to FIGS. 25A and 25B. The division algorithm routine is called in step S2011 in FIG. 20. In the division algorithm routine, the aforementioned six detection areas A, B1, B2, C1, C2, and D are divided into three areas. The first area is an area located at the center of the six areas, i.e., area A. A second areas are areas surrounding area A, i.e., areas B1, B2, C1 and C2. A third area is an area at the peripheral portion of the detection area, i.e., area D.

In step S2501:

(1) an exposure value Evα is determined based on the luminance value Lv'A of the detection area A;

(2) an exposure value Evβ is calculated in accordance with the following equation:

$$Ev\beta = (Lv'B2 * 2 + Lv'C1 + Lv'C2)/4$$

where

Lv'B2 is the luminance value of the detection area B2;

Lv'C1 is the luminance value of the detection area C1; and

Lv'C2 is the luminance value of the detection area C2;

(3) an exposure value Evγ is determined such that it is equal to the luminance value Lv'D of the detection area D.

When Evβ is calculated, the luminance value Lv'B2 is used twice and Lv'B1 is not used. This is because the detection area B1 corresponds to the sky when a normal landscape picture is taken, and the value Lv'B1 is considered to be unnecessary for determining the exposure value.

In step S2503, the minimum exposure value Evβmin is determined. The minimum exposure value Evβmin is the minimum luminance value of the luminance values Lv'B1, Lv'B2, Lv'C1, and Lv'C2 of the second detection areas. The minimum exposure value Evβmin is used in the peripheral-weighted algorithm (described later). In step S2505, each of the exposure values Evα, Evβ, Evγ and Evβmin is limited to 16.5 (Ev). If an exposure value is greater than 16.5 (Ev), it is set to 16.5 (Ev). Thus, information related to strong brightness levels above the 16.5 Ev threshold, are ignored. In step S2507, Evdef is calculated in accordance with the following equation:

$$Evdef = Ev\alpha - Ev\gamma.$$

Based on the calculated Evdef, a coefficient (variable weighting coefficient) kk1 is determined as follows (S2509):

If $0 < |Evdef| < 1$, $kk1 = |Evdef|*8$;

and

If $|Evdef| > 1$, $kk1 = 16 - |Evdef|*8$.

In step S2511, if |Evdef| is smaller than ⅜ (Ev), it is detected that the brightness at the first area and the third area are not significantly different. Therefore, a center-weighted algorithm is used. In this case, coefficients "a", "b" and "c" which are used in a calculation are set such that a=4, b=3, and c=1. In other words, in the center-weighted algorithm, the first area and the second area are weighted more than the third area.

If |Evdef| is equal to or greater than ⅜ (Ev) (N:S2511), it is determined that the object has a high contrast. In step S2515, it is determined whether the object is front-lit or back lit.

If Evdef is equal to or less than −⅜ (Ev), it is determined that the object is back lit, and a variable center-weighted algorithm is used. In this case, the coefficients are set such that a=kk1, b=kk1, c=1 (S2517). In this center-weighted algorithm, the lower the brightness of the first area is, the more the first and second areas are weighted.

If Evdef is equal to or greater than ⅜ (Ev), it is determined that the object is in the front-lighted condition, and a variable peripheral-centered algorithm is used. In this case, Evβ is set to Evβmin regardless of the value of Evβ, and the coefficients are set such that a=1, b=1, and c=kk1 (S2519). Thus, in the peripheral-weighted algorithm, the lower the brightness of the third area is, the more the third area is weighted.

If the panoramic picture mode is selected (Y:S2523), and the brightness value BvD of the area D is less than −1 (Ev) (N:S2525), the coefficiet "c" is set to "0" (zero) (S2527). When the brightness of the area D is measured, the indication "P" is turned OFF. However, due to the response delay of the indication unit or characteristics of the sensor 138D, the effect of the indication may not be completely removed, if the brightness level is low, as shown in FIG. 30. In this embodiment, if the brightness of the area D is relatively low, the brightness of the area D is ignored when the average luminance value is calculated.

From the exposure values Evα, Evβ, Evβ, and the weighting coefficients "a", "b", and "c", and the luminance value Lv' with respect to the entire photometry sensor 138, are calculated (S2529) in accordance with the following equation:

$$Lv' = (a*Ev\alpha + b*Ev\beta + c*Ev\gamma)/(a+b+c+)$$

Figure 25C:
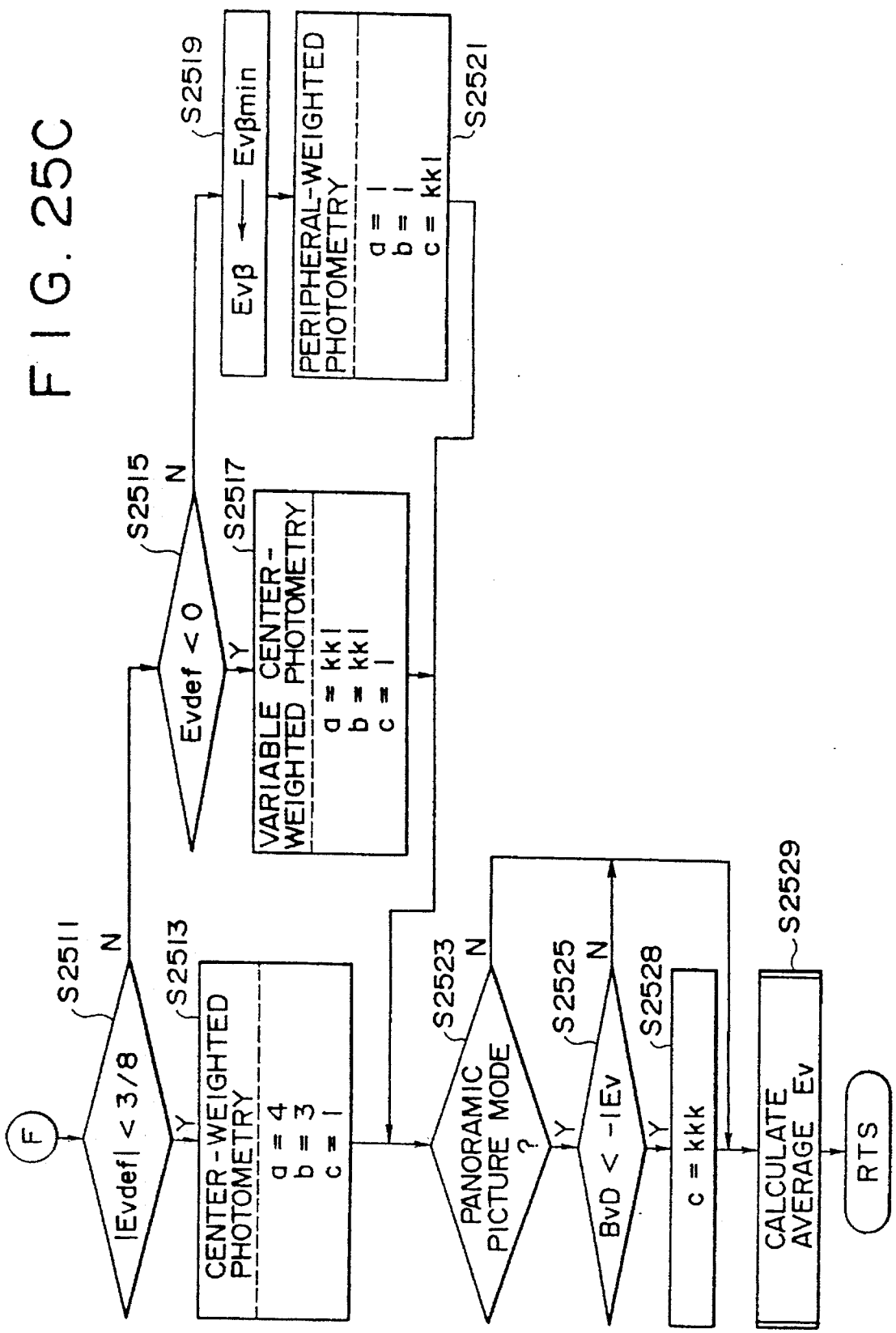
FIG. 25C shows an alternative division algorithm to that shown in FIG. 25B.

FIG. 25C shows an alternative embodiment of the invention. FIG. 25C is a substantially similar flowchart as shown in FIG. 25B, except that step S2527 in FIG. 25B is replaced with step S2528. In step S2528 in FIG. 25C, coefficient "c" is to KKK, where 0<kkk<1. In this alternative embodiment, the brightness of area D is not completely ignored, but a relatively small weighting coefficient is given. Once an appropriate value for kkk is determined, the brightness of area D can be taken into account when the average luminance value is determined, and a relatively accurate luminance value is obtained.

TTL Data Setting Routine

Figure 20B:
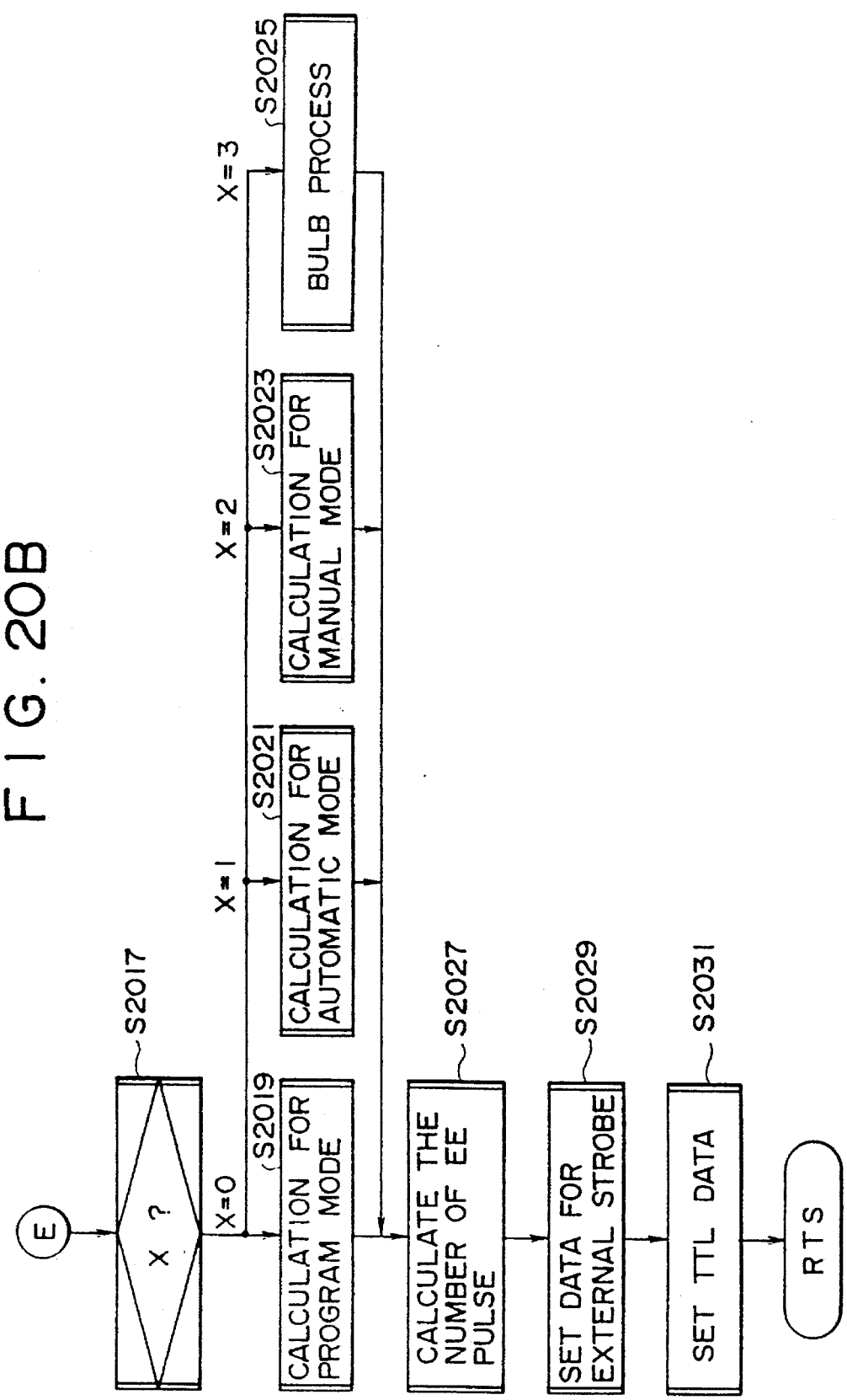

FIG. 26 shows a flowchart illustrating the TTL Data Setting routine which is called in S2031 in FIG. 20B.

If the AE calculation routine is executed with the TTL flash photographing being active, the TTL Data Setting routine is also executed.

In step S2601, a TTL exit pupil compensation calculation is executed to compensate the TTL level when photographing is executed while the strobe is being flashed (S2601). In the TTL exit pupil compensation calculation, a compensation amount COMP1 is calculated based on the data (EXTP), that indicates the position of the exit pupil, and which is transmitted from the CPU of the lens 12, in accordance with the following equation:

$$COMP1 = 16 * (1/EXTP) - \frac{1}{8}.$$

Figure 29:
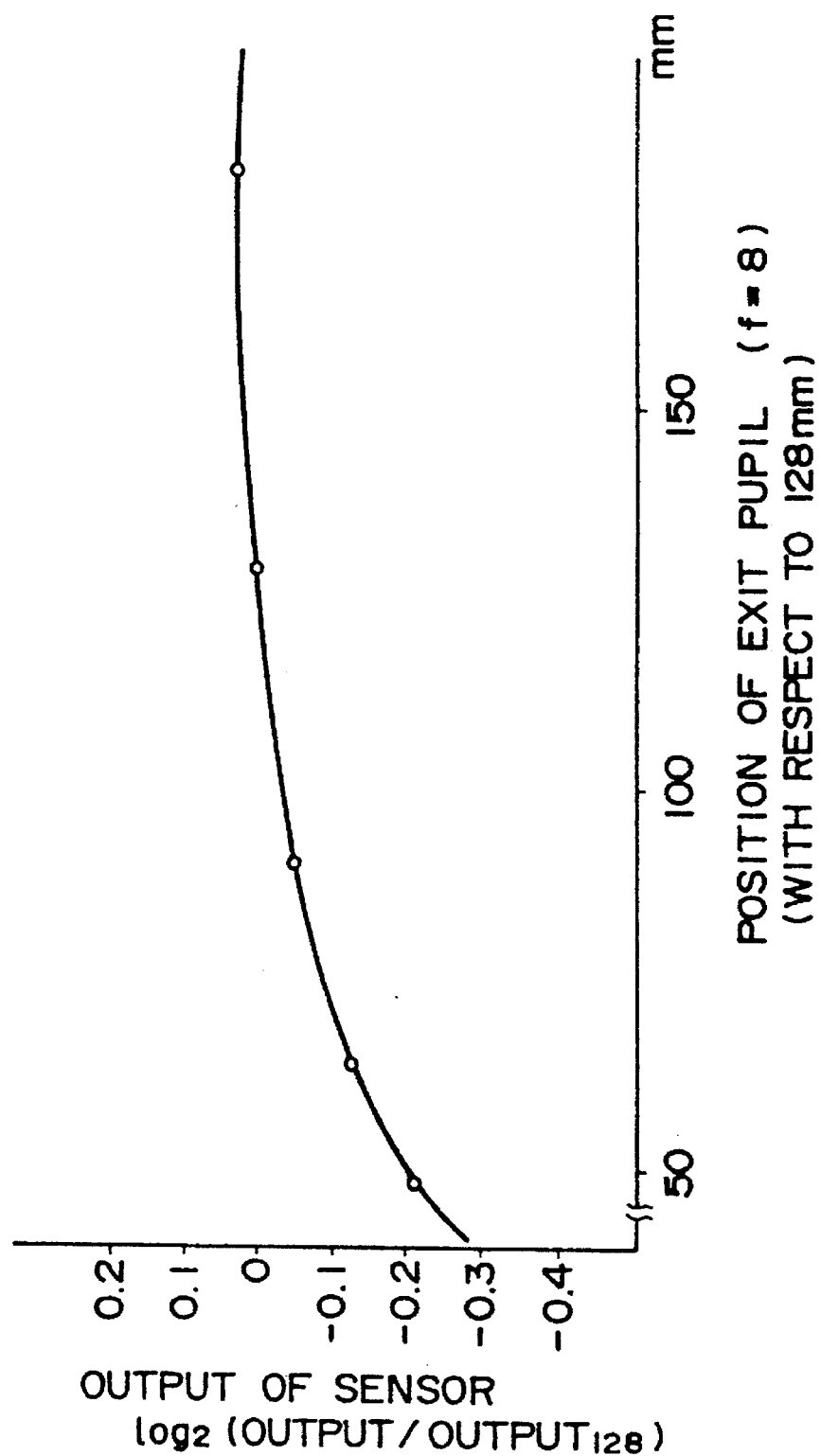
FIG. 29 shows the relationship between an output of the TTL light receiving device and an exit pupil position.

Light from the object is directed to the camera body 10 through the photographing lens 12. Different lenses may have different exit pupil positions even if the focal lengths and the aperture values are the same. If the positions of the exit pupil are different, the angles of the light which is incident on the film surface are different. More specifically, if the exit pupil is close to the film surface, the angle of incidence of the light on the film surface is large; if the exit pupil is far from the film surface, the angle of incidence is small. If the angles of incidence are different, the TTL light receiving device 150 receives the light reflected from the film surface in different ways. For example, if the exit pupil is far from the film surface, the TTL light receiving element 150 receives the light evenly reflected by the film surface. If the exit pupil is close to the film surface, the light reflected by the peripheral area of the film surface may not enter the TTL light receiving element 150. The effect of the position of the exit pupil on the output of the TTL light receiving element is shown in FIG. 29. The exit pupil distance is measured from the film plane.

Accordingly, if the exit pupil is close to the film plane, it may be mistakenly detected that the object is darker than it really is, resulting in the amount of light emitted by the strobe being raised, (i.e., the quench signal is delayed). This results in an over-exposed image.

In order to avoid the above-described problem, in the embodiment, the compensation amount COMP1 is calculated based on the position of the exit pupil of the lens.

In step S2603, an aperture value compensation calculation is executed based on the currently set aperture value Av. In the aperture value compensation calculation, the compensation amount COMP2 which is used for calculating the TTL level is calculated based on the difference of an open f-number (the minimum aperture value AvMin) and the currently set aperture value Av, in accordance with the following equation:

COMP2=(Avmin−Av+10/8)/4, where, if the calculated COMP2 is less than 0(zero), COMP 2 is set to 0 (zero).

Figure 28:
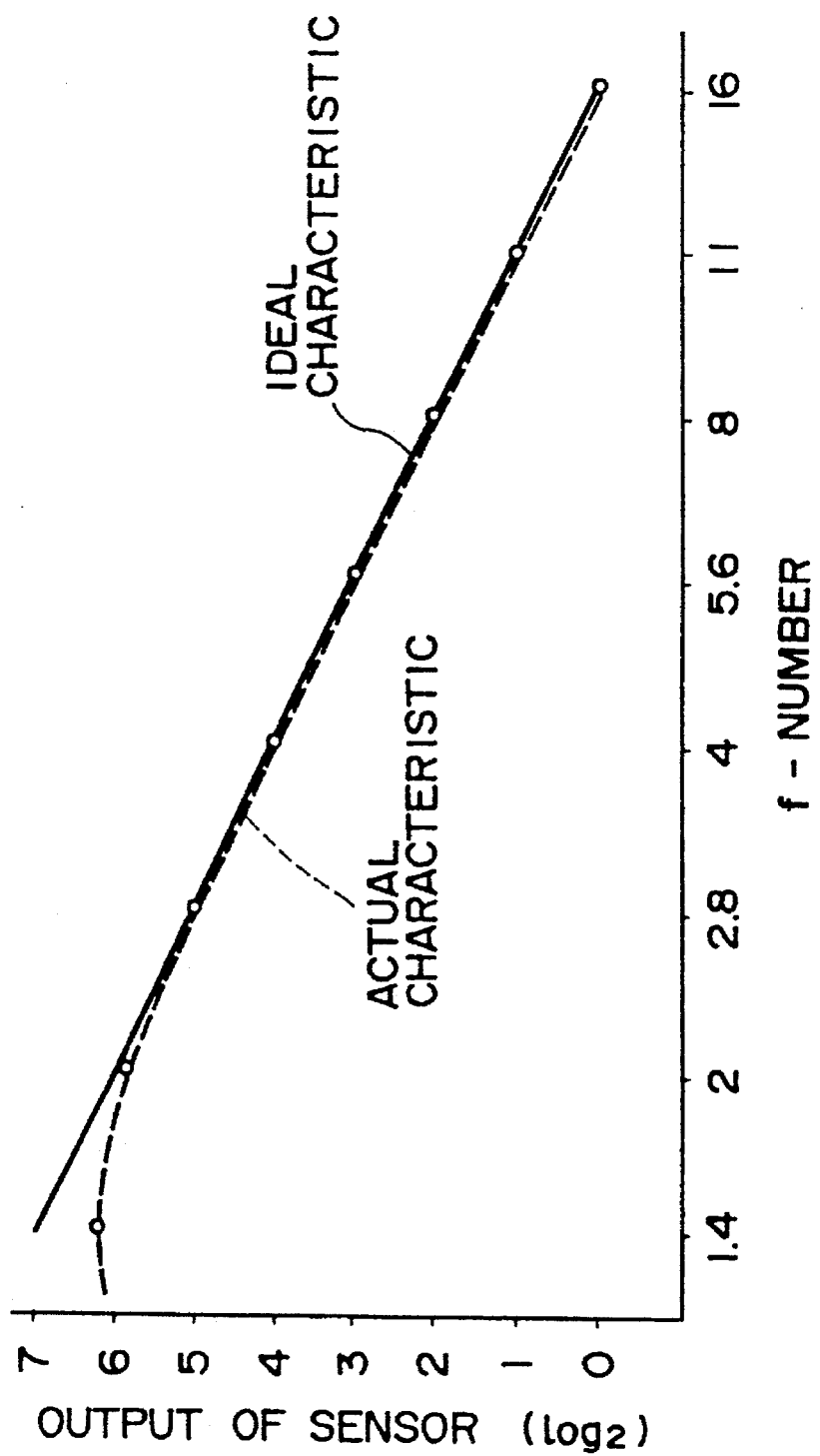
FIG. 28 shows a flowchart of the TTL data setting routine used in the AE calculation subroutine.

The TTL light receiving device 150 shows a substantially linear characteristic as shown in FIG. 28. However, when the aperture value is set to a value close to the minimum value, the TTL light receiving device tends to output a smaller value than the ideal linear value as indicated by the broken line. In other words, when the aperture value is close to the minimum value, the measured value tends to be lower than the ideal value.

In the present embodiment, in order to avoid the problem described above, the compensation amount COMP2 is used. By using the compensation amount COMP2, the output of the TTL light receiving device shows a substantially linear characteristic, and therefore avoids over-exposing the image that is recorded on the film, when the strobe is used.

If the panoramic picture mode is selected, a compensation amount COMP3 is set to 2/8 (S2605, S2607).

When the panoramic picture mode is selected, the light shielding plates 92 and 94 cover the photographing area of the film surface. In this case, even if the intensity of the light from the object is unchanged, since the TTL light receiving element 150 receives light from a smaller area of the film plane, it is determined that the object is darker than it actually is. This results in an over-exposed image being recorded on the film since the amount of light emitted by the strobe is increased.

In order to avoid such a problem, the compensation amount COMP3 is set to 2/8.

In step S2609, the TTL level is calculated based on the Speed value Sv, the exposure compensation value Xv, and the compensation values COMP1, COMP2 and COMP3 obtained above in accordance with the following equation:

TTL level=Sv−Xv+COMP1+COMP2+COMP3.

The calculated TTL level is regulated so as to be between the upper limit and the lower limit (S2811 through S2617).

From this calculated TTL level, with reference to the TTL_D/A table shown in FIG. 27, a TTL_D/A value, a TTL gain, and a D/A gain are obtained (S2619).

In steps S2621 and S2623, the TTL_D/A value is modified by using the adjustment data 1 and 2 so that the unevenness of the characteristics and assembling errors are canceled. Thereafter, control returns to where the subroutine was called from.

The TTL data is transmitted to a D/A conversion circuit and converted into an analog voltage. The converted analog voltage is used as a threshold level in the hardware circuit and with the TTL light receiving element 150.

The TTL light receiving element 150 receives the light reflected by the film surface. The light is integrated in the integration circuit 166. If the integrated value (voltage) exceeds the threshold value converted as above, the TTL integration circuit outputs the quench signal. Upon reception of the quench signal, the strobe 54 and/or the external strobe 182 stop emitting light.

As described above, when the camera embodying the present invention is being used in a panoramic picture mode, a visual indication of this mode is displayed in the viewfinder. Further, when an exposure measurement is being made, the visual indication is turned OFF, so as not to interfere with the photometry process. The period that the indication is turned OFF is very short and is imperceptible to the operator of the camera. Further depending on the brightness of the image that is to be photographed, the brightness of the visual indication is adjusted so that the visual indication has the proper contrast with respect to the image seen in the viewfinder.

If the brightness of the image is low, the brightness detected of the area nearest the area where the visual indication is projected, may have a low weighting or may be ignored, so as to cancel any effects that the visual indication may have on the sensor.

The visual indication illustrated in the above embodiment consists of an LED illuminating a mask such that a letter P is formed on the focusing screen. However, the visual indication is not limited to this arrangement and any letter or shape, or color of light can be used. Further the light source does not need to be an LED but can be any type of light source.

An SLR camera is used to illustrate the application of the invention. However, the invention may be applied to other cameras where the photometric system and the finder system share a common optical path.

The present disclosure relates to subject matter contained in Japanese Patent Application No. HEI 5-139551 (filed on May 17, 1993) which is expressly incorporated in its entirety by its reference herein.

What is claimed is:

1. A photometry system for a camera, said camera comprising:

a finder optical system for receiving light from an object and for forming an image of said object on a finder field, said image corresponding to an image to be formed on a film surface;

an indicator that produces a predetermined image; and means for projecting said predetermined image onto a predetermined area of said finder field, wherein said photometry system comprises:

photometry means for detecting a brightness of said image formed on said finder field; and control means for inhibiting said projecting of said predetermined image for a period of time when said photometry means detects detecting a brightness of a predetermined portion of said finder field, said predetermined portion of said finder field including said predetermined area.

2. The photometry system according to claim 1, wherein said photometry means comprises a plurality of photometry sensors, and wherein said finder field is divided into a plurality of areas, brightnesses of said plurality of areas being detected by said plurality of photometry sensors, respectively.

3. The photometry system according to claim 2, wherein said predetermined area is included in at least one of said plurality of areas, and wherein said indicator is turned OFF when at least one of said plurality of sensors for detecting said at least one of said plurality of areas is enabled.

4. The photometry system according to claim 3, further comprising means for calculating a final brightness value of said object based on said plurality of brightnesses, said plurality of brightnesses being weighted when said final brightness value is calculated, at least one brightness detected by said at least one of said plurality of areas having a lower weighting than other brightnesses.

5. The photometry system according to claim 3, further comprising means for calculating a final brightness value of said object based on said plurality of brightnesses, said plurality of brightnesses being weighted when said final brightness value is calculated, and wherein brightnesses detected by said at least one of said plurality of photometry sensors are ignored.

6. The photometry system according to claim 1, wherein said indicator switches a brightness level of said predetermined image from a first brightness level to a second brightness level when said object image brightness becomes less than a first threshold level, and wherein said indicator switches said predetermined image brightness level from said second brightness level to said first brightness level when said object image brightness level exceeds a second threshold level, wherein said second threshold level is different from said first threshold level and said first brightness level is greater than said second brightness level.

7. The photometry system according to claim 1, wherein said camera comprises at least a first photographing mode and a second photographing mode, a photographic picture image frame size to be formed on a film surface of said second photographing mode being smaller than a photographic picture frame image size to be formed on a film surface of said first photographing mode, and wherein said indicator projects said predetermined image only when said second photographing mode is selected.

8. The photometric system according to claim 7, wherein said predetermined area of said finder field is in an area outside of an image forming area of said finder field corresponding to said second photographing mode and with an image forming area of said finder field corresponding to said first photographing mode.

9. The photometry system of claim 1, wherein said camera comprises an SLR camera.

10. A photometry system for a camera, said camera comprising:

a finder optical system for receiving light from an object and for forming an image of said object on a finder field, said image corresponding to an image to be formed on a film surface, said finder field being divided into a plurality of light detecting areas;

an indicator that produces a predetermined image; and means for projecting said predetermined image onto a predetermined area of said finder field, wherein said photometry system comprises:

a plurality of photometry sensors for detecting respective brightnesses of said plurality of light detecting areas; and calculation means for calculating a final brightness value of said plurality of photometry sensors, said brightnesses being weighted when said final brightness value is calculated, wherein a brightness of a light detecting area which is nearest to said predetermined area has a lower weighting than other light detecting areas.

11. The photometry system according to claim 10, wherein said brightness of said light detecting area nearest said predetermined area, is ignored.

12. The photometry system of claim 10, wherein said camera comprises an SLR camera.

13. A photometry system for a camera, said camera comprising:

a finder optical system for receiving light from an object and for forming an image of said object on a finder field, said image corresponding to an image to be formed on a film surface; and means for projecting a predetermined image on said finder field, wherein said photometry system comprises:

means for detecting a brightness level of an image formed on said finder field, said detecting means having a plurality of sensors, each of said plurality of sensors detecting a brightness level of a different area of said finder field, wherein said predetermined image is inhibited from being projected when a sensor that detects a brightness level of an area of said finder field where said image is projected is detecting a brightness of said area.

14. The photometry system according to claim 13, wherein a brightness level of said projected image is adjusted depending on a brightness level of said image formed on said finder field.

15. The photometry system according to claim 13, wherein a final brightness value comprises a weighted average of brightness levels detected by each of said sensors.

16. The photometry system according to claim 13, wherein said brightness level of said area is ignored when determining said final brightness value if a brightness level of said area where said predetermined image is projected is below a predetermined threshold level.

17. The photometry system according to claim 13, wherein said camera comprises a panoramic picture mode and a full size picture mode, wherein said predetermined image is projected when said panoramic picture mode is selected.

18. The photometry system according to claim 13, wherein said light received by said finder optical system is first transmitted through a photographing lens, wherein said photographing lens transmits said light to form said image to be formed on said film surface.

19. The photometry system of claim 13, wherein said camera comprises an SLR camera.

20. A camera, comprising:

a finder optical system for receiving light from an object and for forming an image of said object on a finder field, said image corresponding to an image to be formed on a film surface;

an indicator that produces a predetermined image;

means for projecting said predetermined image onto a predetermined area of said finder field;

a photometry system that detects a brightness of said image formed on said finder field; and a control system that inhibits said projecting of said predetermined image for a period of time when said photometry system detects a brightness of a portion of said finder field, said predetermined portion of said finder field including said predetermined area.

21. The camera of claim 20, wherein said camera comprises an SLR camera.

22. A camera, comprising:

a finder field;

a photometry system for obtaining a brightness measurement of an image in said finder field;

an indicator that produces a predetermined image related to a photographing parameter of said camera;

a projector system that projects said predetermined image onto said finder field; and an inhibiting system that inhibits said projecting of said predetermined image for a predetermined period of time in response to said photometry system obtaining a brightness measurement.

23. The camera of claim 22, wherein said photometry system comprises a plurality of photometry sensors that obtain brightness measurements of a plurality of predetermined areas of said finder field, said indicator being projected to a predetermined area of said finder field.

24. The camera of claim 22, wherein said photographing parameter comprises a panoramic picture mode.

25. The camera of claim 22, wherein said camera comprises an SLR camera.

* * * * *

UNITED STATES PATENT AND TRADEMARK OFFICE
CERTIFICATE OF CORRECTION

PATENT NO. : 5,471,276
DATED : November 28, 1995
INVENTOR(S) : I. HIRAI et al.

It is certified that error appears in the above-indentified patent and that said Letters Patent is hereby corrected as shown below:

On the title page, item: [56], "References Cited", "U.S. PATENT DOCUMENTS", column 2, line 3, change "354/475X" to ---354/475XR---.

On the title page, item: [56], "References Cited", "U.S. PATENT DOCUMENTS", column 2, line 7, change "354/471X" to ---354/471XR---.

On the On the title page, item: [57], "ABSTRACT", line 7, change "field:" to ---field;---.

At column 20, line 4 (claim 11, line 3), change "area," to ---area---.

Signed and Sealed this

Eighth Day of October, 1996

Attest:

BRUCE LEHMAN

*Attesting Officer*  *Commissioner of Patents and Trademarks*